United States Patent
Watanabe et al.

(10) Patent No.: US 9,412,113 B2
(45) Date of Patent: *Aug. 9, 2016

(54) PERFORMANCE DATA SEARCH USING A QUERY INDICATIVE OF A TONE GENERATION PATTERN

(75) Inventors: Daichi Watanabe, Hamamatsu (JP); Takuya Fujishima, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/451,374

(22) Filed: Apr. 19, 2012

(65) Prior Publication Data

US 2012/0271847 A1    Oct. 25, 2012

(30) Foreign Application Priority Data

Apr. 21, 2011  (JP) ................................. 2011-095473
Apr. 18, 2012  (JP) ................................. 2012-094414

(51) Int. Cl.
*G06F 17/30* (2006.01)
*G06Q 30/02* (2012.01)
*G10H 1/38* (2006.01)
*G10H 1/42* (2006.01)

(52) U.S. Cl.
CPC .......... *G06Q 30/02* (2013.01); *G06F 17/30743* (2013.01); *G06F 17/30758* (2013.01); *G06F 17/30864* (2013.01); *G10H 1/383* (2013.01); *G10H 1/386* (2013.01); *G10H 1/42* (2013.01); *G10H 2210/361* (2013.01); *G10H 2240/141* (2013.01)

(58) Field of Classification Search
None
See application file for complete search history.

(56) References Cited

U.S. PATENT DOCUMENTS

| 5,496,962 | A  | * | 3/1996 | Meier et al. ................. 84/601 |
| 5,918,303 | A  |   | 6/1999 | Yamaura et al. |
| 6,096,961 | A  |   | 8/2000 | Bruti et al. |
| 6,528,715 | B1 |   | 3/2003 | Gargi |

(Continued)

FOREIGN PATENT DOCUMENTS

| JP | H07-110685 A | 4/1995 |
| JP | H08-185165 A | 7/1996 |

(Continued)

OTHER PUBLICATIONS

European Search Report mailed Aug. 9, 2012, for EP Patent Application No. 12164922.2, six pages.

(Continued)

*Primary Examiner* — Rehana Perveen
*Assistant Examiner* — Raheem Hoffler
(74) *Attorney, Agent, or Firm* — Morrison & Foerster LLP

(57) ABSTRACT

A user inputs, as a query pattern, a desired search-object rhythm pattern by operating a rhythm input device. At that time, a determination is made of a style of operation performed by a user on a rhythm input device, such as whether the user has operated a single key or a plurality of keys, or duration or intensity of the operation, and then, a user-intended performance part is identified, on the basis of the determined style of operation, from among one or more performance parts constituting a performance data set (automatic accompaniment data set). For the thus-identified performance part, a rhythm pattern search section searches an automatic accompaniment database for an automatic accompaniment data set including a rhythm pattern that matches the input rhythm pattern (query pattern).

11 Claims, 14 Drawing Sheets

(56) References Cited

U.S. PATENT DOCUMENTS

| | | | |
|---|---|---|---|
| 2002/0073098 A1 | 6/2002 | Zhang et al. | |
| 2003/0100967 A1 | 5/2003 | Ogasawara | |
| 2006/0065105 A1 | 3/2006 | Iketani et al. | |
| 2007/0175317 A1* | 8/2007 | Salter | G10H 1/0025 84/609 |
| 2008/0078281 A1* | 4/2008 | Katsuta | 84/609 |
| 2008/0148924 A1 | 6/2008 | Tsui et al. | |
| 2009/0260507 A1 | 10/2009 | Gannon | |
| 2011/0003638 A1* | 1/2011 | Lee et al. | 463/35 |
| 2011/0192271 A1 | 8/2011 | Georges | |
| 2012/0278358 A1 | 11/2012 | Watanabe et al. | |

FOREIGN PATENT DOCUMENTS

| | | |
|---|---|---|
| JP | H11-288278 A | 10/1999 |
| JP | 2001-155031 A | 6/2001 |
| JP | 2002-341867 A | 11/2002 |
| JP | 2006-106818 A | 4/2006 |
| JP | 2006-171442 A | 6/2006 |
| JP | 2008-234453 A | 10/2008 |
| JP | 2010-102076 A | 5/2010 |

OTHER PUBLICATIONS

European Search Report mailed Jul. 30, 2012, for EP Application No. 12164921.4, eight pages.

Final Office Action mailed Nov. 7, 2014, for U.S. Appl. No. 13/451,336, filed Apr. 19, 2012, 18 pages.

Non-Final Office Action mailed Apr. 25, 2014, for U.S. Appl. No. 13/451,336, filed Apr. 19, 2012, 13 pages.

Notice of Grounds for Rejection (Office Action), mailed Sep. 1, 2015, for JP Patent Application No. 2012-094413, with English translation, five pages.

Non-Final Office Action mailed May 13, 2015, for U.S. Appl. No. 13/451,336, filed Apr. 19, 2012, 21 pages.

Notice of Grounds for Rejection (Office Action), mailed Dec. 1, 2015, for JP Patent Application No. 2012-094414, with English translation, six pages.

Chinese Search Report dated Dec. 3, 2015, for CN Application No. 201210120948.1, with English translation, four pages.

Chinese Search Report dated Dec. 3, 2015, for CN Application No. 201210121046.x, with English translation, four pages.

Notice of Grounds for Rejection (Office Action), mailed Dec. 8, 2015, for JP Application No. 2012-094413, with English translation, five pages.

Notification of the first Office Action dated Dec. 3, 2015, for CN Application No. 201210120948.1, with English translation, 11 pages.

Notification of the first Office Action dated Dec. 3, 2015, for CN Application No. 201210121046.x, with English translation, seven pages.

\* cited by examiner

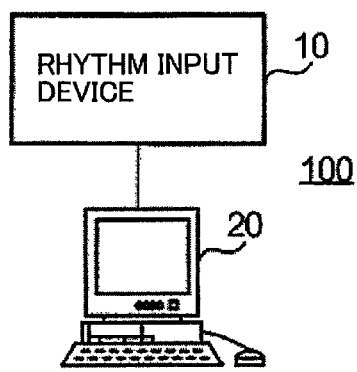
F I G. 1
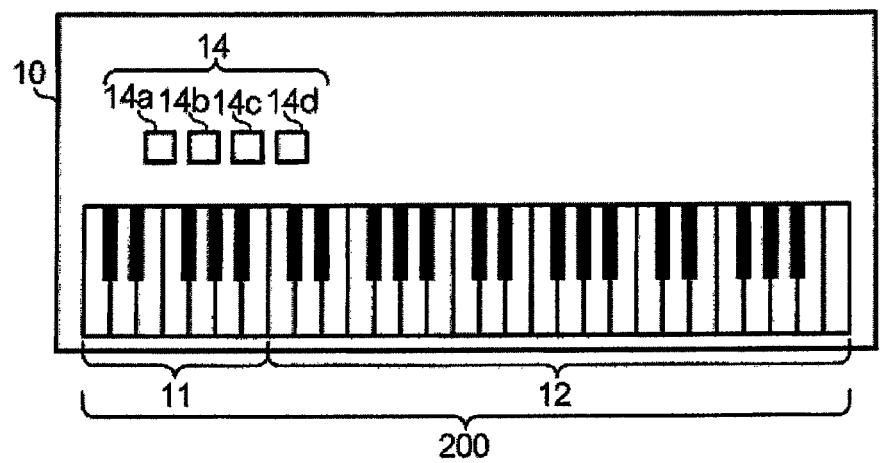
F I G. 2

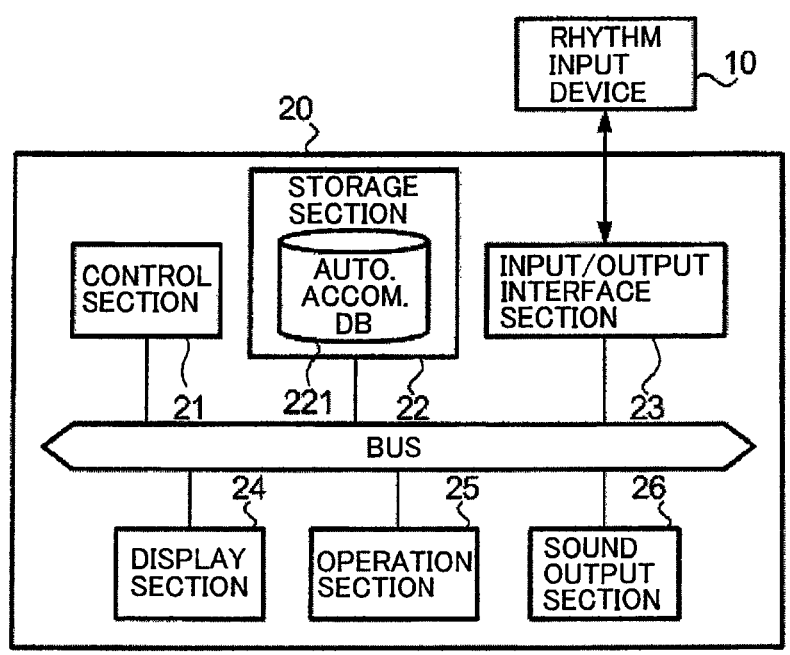
F I G. 3

| PART ID | PART | NOTE NO. | NUMBER OF CONTROL | CHANNEL INFO. |
|---|---|---|---|---|
| 01 | BASS | <=45 | — | — |
| 02 | CHORD | 45< | PLURAL | — |
| 03 | PHRASE | 45< | SINGULAR | — |
| 04 | BASS DRUM | — | — | 14a |
| 05 | SNARE DRUM | — | — | 14b |
| 06 | HIGH-HAT | — | — | 14c |
| 07 | CYMBALS | — | — | 14d |
| ... | ... | ... | ... | ... |

F I G. 4 A

| PART ID | MUSICAL INSTRU. ID | MUSICAL INSTRU. TYPE |
|---|---|---|
| 01 | 001 | WOODEN BASS |
| 01 | 002 | ELECTRIC BASS |
| 01 | 003 | SLAP BASS |
| 02 | 004 | PIANO |
| 02 | 005 | ORGAN |
| 02 | 006 | ELECTRIC GUITAR |
| ... | ... | ... |

F I G. 4 B

| RHYTHM CATEGORY ID | RHYTHM CATEGORY |
|---|---|
| 01 | EIGHTH |
| 02 | SIXTEENTH |
| 03 | EIGHTH TRIPLET |
| ... | ... |

| PART ID | MUSICAL INSTRU. TYPE ID | RHYTHM PATTERN ID | RHYTHM CATEGORY ID | RHYTHM PATTERN DATA | ATTACK INTENSITY PATTERN DATA |
|---|---|---|---|---|---|
| 03 | 040 | 0001 | 01 | RockGuitar1Rhythm.txt | RockGuitar1AttackPower.txt |

| PART ID | MUSICAL INSTRU. TYPE ID | RHYTHM PATTERN ID | RHYTHM CATEGORY ID | RHYTHM PATTERN DATA | ATTACK INTENSITY PATTERN DATA |
|---|---|---|---|---|---|
| 02 | 015 | 0001 | 01 | Piano1Rhythm.txt | Piano1AttackPower.txt |

| PART ID | MUSICAL INSTRU. TYPE ID | RHYTHM PATTERN ID | RHYTHM CATEGORY ID | RHYTHM PATTERN DATA | ATTACK INTENSITY PATTERN DATA |
|---|---|---|---|---|---|
| 01 | 001 | 0001 | 01 | WoodBass1Rhythm.txt | WoodBass1AttackPower.txt |
| 01 | 001 | 0002 | 01 | WoodBass2Rhythm.txt | WoodBass2AttackPower.txt |
| 01 | 001 | 0003 | 02 | WoodBass3Rhythm.txt | WoodBass3AttackPower.txt |
| 01 | 002 | 0004 | 01 | ElectricBass1Rhythm.txt | ElectricBass1AttackPower.txt |
| 01 | 002 | 0005 | 01 | ElectricBass2Rhythm.txt | ElectricBass2AttackPower.txt |
| 01 | 002 | 0006 | 01 | ElectricBass3Rhythm.txt | ElectricBass3AttackPower.txt |
| 01 | 002 | 0007 | 02 | ElectricBass4Rhythm.txt | ElectricBass4AttackPower.txt |
| ... | ... | ... | ... | ... | ... |

FIG. 6

| STYLE ID | GENRE NAME | STYLE NAME | KEY | BPM | BASS RHYTHM PATTERN ID | CHORD RHYTHM PATTERN ID | PHRASE RHYTHM PATTERN ID | BASS DRUM RHYTHM PATTERN ID | SNARE DRUM RHYTHM PATTERN ID | HIGH-HAT RHYTHM PATTERN ID | CYMBAL RHYTHM PATTERN ID |
|---|---|---|---|---|---|---|---|---|---|---|---|
| 0001 | JAZZ | Bebop1 | A | 145 | 0001 | 0001 | 0001 | 0001 | 0001 | 0001 | 0001 |
| 0002 | JAZZ | Bebop2 | E | 147 | 0002 | 0002 | 0002 | 0002 | 0002 | 0002 | 0002 |
| 0003 | JAZZ | Hard Bop1 | E | 155 | 0003 | 0003 | 0003 | 0003 | 0003 | 0003 | 0003 |
| 0004 | JAZZ | Hard Bop2 | G | 138 | 0004 | 0004 | 0004 | 0004 | 0004 | 0004 | 0004 |
| 0005 | JAZZ | Hard Bop3 | A | 142 | 0005 | 0005 | 0005 | 0005 | 0005 | 0005 | 0005 |
| 0006 | JAZZ | Hard Bop4 | D | 149 | 0006 | 0006 | 0006 | 0006 | 0006 | 0006 | 0006 |
| 0007 | JAZZ | Free Jazz1 | E | 110 | 0007 | 0007 | 0007 | 0007 | 0007 | 0007 | 0007 |
| 0008 | JAZZ | Free Jazz2 | E | 140 | 0008 | 0008 | 0008 | 0008 | 0008 | 0008 | 0008 |
| 0009 | JAZZ | Free Jazz3 | D | 124 | 0009 | 0009 | 0009 | 0009 | 0009 | 0009 | 0009 |
| 0010 | JAZZ | Latin Jazz1 | G | 118 | 0010 | 0010 | 0010 | 0010 | 0010 | 0010 | 0010 |
| ... | ... | ... | ... | ... | ... | ... | ... | ... | ... | ... | ... |

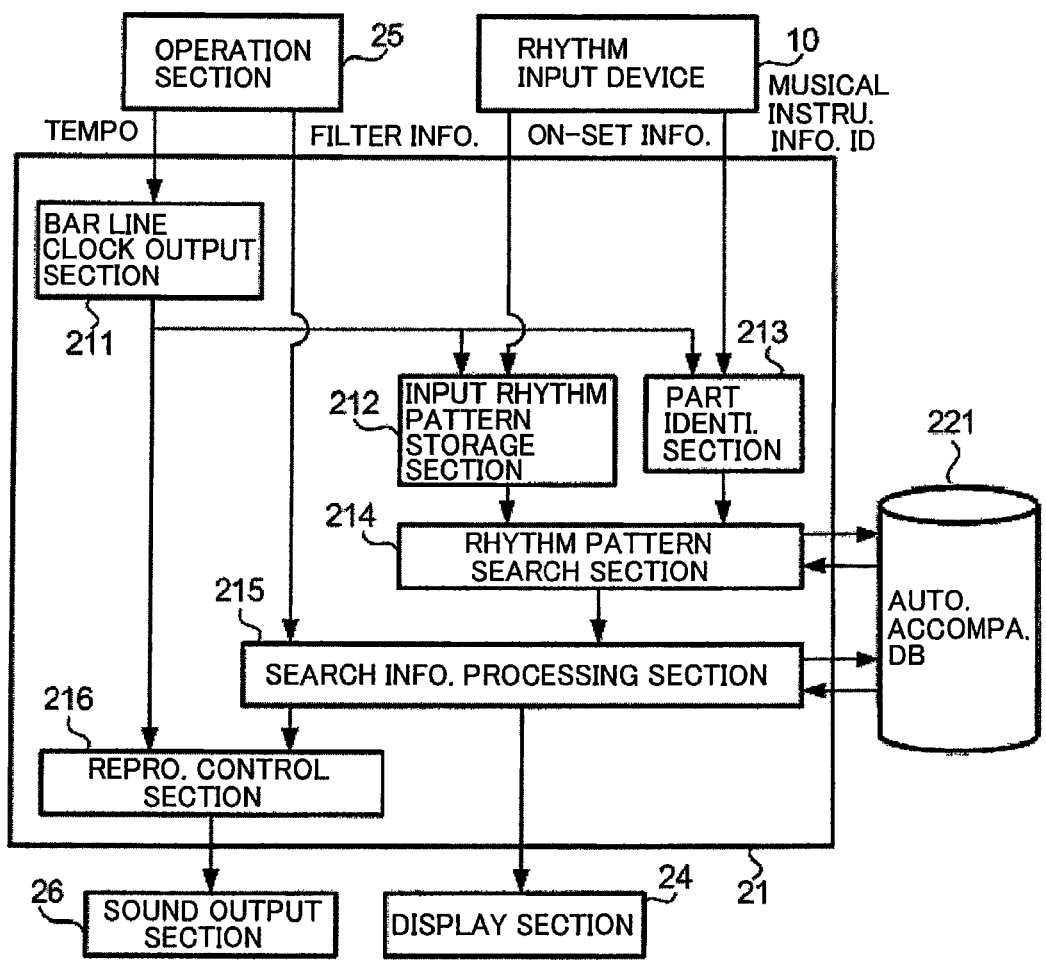
F I G. 7

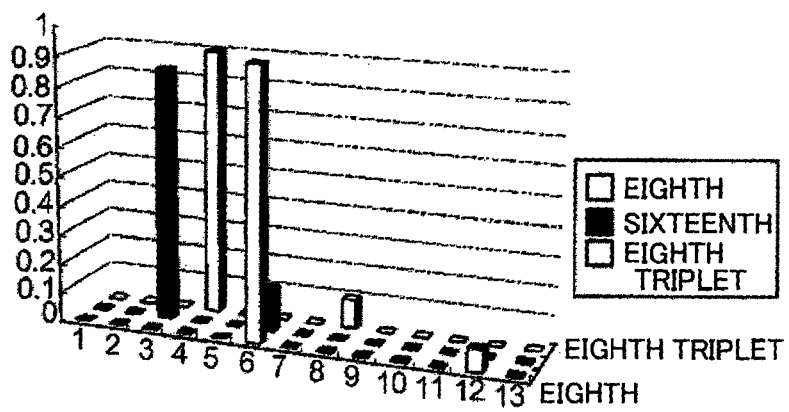
F I G. 9 A
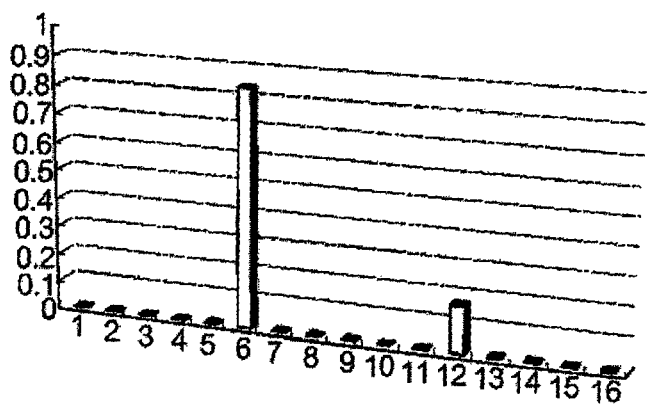
F I G. 9 B
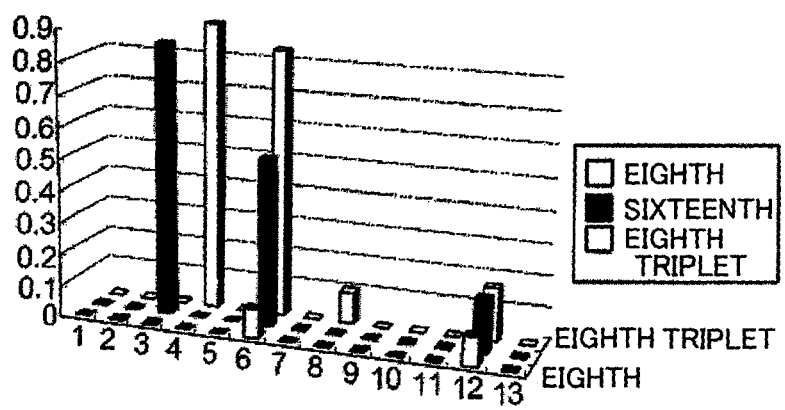
F I G. 9 C

INPUT TEMPO BPM100  TEMPO FILTER OFF

| 1ST SEARCH PART | CHORD | | | | |
|---|---|---|---|---|---|
| 2ND SEARCH PART | | | | | |
| No. | STYLE NAME | SIMILARITY | KEY | GENRE | BPM |
| 1 | Hard Rock 2 | 0.0352 | B | Rock | 120 |
| 2 | Free Jazz 3 | 0.0356 | D | Jazz | 124 |
| 3 | Roots Reggae 3 | 0.0356 | A | Reggae | 105 |
| 4 | Blues Rock 4 | 0.0469 | E | Rock | 148 |
| 5 | Dancehall Reggae 1 | 0.0480 | B | Reggae | 135 |
| 6 | R&B 8 | 0.0813 | D | Soul,R&B | 114 |
| 7 | 70's Funk 5 | 0.0921 | D | Soul,R&B | 130 |
| 8 | Deep House 2 | 0.1125 | C | House | 124 |
| 9 | Salsa 3 | 0.1145 | A | Latin | 176 |
| 10 | AfroBeat 4 | 0.3854 | E | Africa | 113 |

FIG. 11A

INPUT TEMPO BPM100  TEMPO FILTER OFF

| 1ST SEARCH PART | CHORD | | | | |
|---|---|---|---|---|---|
| 2ND SEARCH PART | | | | | |
| No. | STYLE NAME | SIMILARITY | KEY | GENRE | BPM |
| 1 | Hard Rock 2 | 0.0352 | B | Rock | 120 |
| 2 | Free Jazz 3 | 0.0356 | D | Jazz | 124 |
| 3 | Roots Reggae 3 | 0.0356 | A | Reggae | 105 |
| 4 | Dancehall Reggae 1 | 0.0480 | B | Reggae | 135 |
| 5 | R&B 8 | 0.0813 | D | Soul,R&B | 114 |
| 6 | 70's Funk 5 | 0.0921 | D | Soul,R&B | 130 |
| 7 | Deep House 2 | 0.1125 | C | House | 124 |
| 8 | AfroBeat 4 | 0.3854 | E | Africa | 113 |

FIG. 11B

INPUT TEMPO BPM100  TEMPO FILTER OFF

| 1ST SEARCH PART | CHORD | | | | |
|---|---|---|---|---|---|
| 2ND SEARCH PART | | | | | |
| No. | STYLE NAME | SIMILARITY | KEY | GENRE | BPM |
| 1 | Hard Rock 2 | 0.0670 | B | Jazz | 120 |
| 2 | Dancehall Reggae 1 | 0.1214 | B | Reggae | 135 |
| 3 | Roots Reggae 3 | 0.1295 | A | Reggae | 105 |
| 4 | 70's Funk 5 | 0.2451 | D | Soul,R&B | 130 |
| 5 | AfroBeat 4 | 0.4258 | E | Africa | 113 |

| STYLE ID | GENRE NAME | STYLE NAME | KEY | BPM | BASS RHYTHM PATTERN ID | BASS MELODY PATTERN ID | CHORD RHYTHM PATTERN ID | CHORD MELODY PATTERN ID | PHRASE RHYTHM PATTERN ID | PHRASE MELODY PATTERN ID | ... |
|---|---|---|---|---|---|---|---|---|---|---|---|
| 0001 | JAZZ | Bebop1 | A | 145 | 0001 | 0001 | 0001 | 0001 | 0001 | 0001 | ... |
| 0002 | JAZZ | Bebop2 | E | 147 | 0002 | 0002 | 0002 | 0002 | 0002 | 0002 | ... |
| 0003 | JAZZ | Hard Bop1 | E | 155 | 0003 | 0003 | 0003 | 0003 | 0003 | 0003 | ... |
| 0004 | JAZZ | Hard Bop2 | G | 138 | 0004 | 0004 | 0004 | 0004 | 0004 | 0004 | ... |
| 0005 | JAZZ | Hard Bop3 | A | 142 | 0005 | 0005 | 0005 | 0005 | 0005 | 0005 | ... |
| 0006 | JAZZ | Hard Bop4 | D | 149 | 0006 | 0006 | 0006 | 0006 | 0006 | 0006 | ... |
| 0007 | JAZZ | Free Jazz1 | E | 110 | 0007 | 0007 | 0007 | 0007 | 0007 | 0007 | ... |
| 0008 | JAZZ | Free Jazz2 | E | 140 | 0008 | 0008 | 0008 | 0008 | 0008 | 0008 | ... |
| 0009 | JAZZ | Free Jazz3 | D | 124 | 0009 | 0009 | 0009 | 0009 | 0009 | 0009 | ... |
| 0010 | JAZZ | Latin Jazz1 | G | 118 | 0010 | 0010 | 0010 | 0010 | 0010 | 0010 | ... |
| ... | ... | ... | ... | ... | ... | ... | ... | ... | ... | ... | ... |

| RHYTHM CATEGORY | TARGET ON-SET TIME | SCORE |
|---|---|---|
| FOURTH | 0,11,12,23,24,35,36,47 | 2 |
| EIGHTH | 5,6,17,18,29,30,41,42 | 2 |
| | 0,11,12,23,24,35,36,47 | 1 |
| EIGHTH TRIPLET | 3,4,7,8,15,16,19,20,27,28,31,32,39,40,43,44 | 2 |
| | 0,11,12,23,24,35,36,47 | 1 |
| SIXTEENTH | 2,3,8,9,14,15,20,21,26,27,32,33,38,39,44,45 | 2 |
| | 0,11,12,23,24,35,36,47,5,6,17,18,29,30,41,42 | 1 |

| PART ID | PART | NOTE NO. | NUMBER OF CONTROL | DURATION | CHANNEL INFO. |
|---|---|---|---|---|---|
| 01 | BASS | <=45 | — | — | — |
| 02 | CHORD | 45< | PLURAL | LONG | — |
| 03 | PHRASE | 45< | SINGULAR | — | — |
| 04 | BASS DRUM | 45< | PLURAL | SHORT | 14a |
| 05 | SNARE DRUM | — | — | — | 14b |
| 06 | HIGH-HAT | — | — | — | 14c |
| 07 | CYMBALS | — | — | — | 14d |
| ... | ... | ... | ... | ... | ... |

FIG. 15A

| PART ID | PART | NOTE NO. | NUMBER OF CONTROL | VELOCITY | CHANNEL INFO. |
|---|---|---|---|---|---|
| 01 | BASS | <=45 | — | — | — |
| 02 | CHORD | 45< | PLURAL | — | — |
| 03 | PHRASE | 45< | SINGULAR | WEAK | — |
| 04 | BASS DRUM | — | — | — | 14a |
| 05 | SNARE DRUM | 45< | PLURAL | STRONG | 14b |
| 06 | HIGH-HAT | — | — | — | 14c |
| 07 | CYMBALS | — | — | — | 14d |
| ... | ... | ... | ... | ... | ... |

FIG. 15B

| RHYTHM CATEGORY | TARGET ON-SET TIME INTERVAL |
|---|---|
| FOURTH | 11,12,23,24,35,36 |
| EIGHTH | 5,6,29,30,41,42 |
| EIGHTH TRIPLET | 3,4 |
| SIXTEENTH | 2,3,14,15,20,21,27,28,32,33,44,45 |
| 1.5 BEAT | 17,18 |
| 0.75 BEAT | 8,9 |
| | 7,8,15,16,19,20 |

F I G. 1 6

| | | RHYTHM CATEGORY OF DB | | | | | | |
|---|---|---|---|---|---|---|---|---|
| | | FOURTH | EIGHTH | 1.5 BEAT | SIXTEENTH | 0.75 BEAT | EIGHTH TRIPLET | Swing |
| INPUT RHYTHM CATEGORY | FOURTH | 0 | 0.8 | 0.8 | 0.8 | 0.8 | 0.8 | 0.5 |
| | EIGHTH | 0.8 | 0 | 0.4 | 0.5 | 0.8 | 1 | 1 |
| | 1.5 BEAT | 0.8 | 0.4 | 0 | 0.8 | 0.6 | 1 | 1 |
| | SIXTEENTH | 0.8 | 0.5 | 0.8 | 0 | 0.6 | 1 | 1 |
| | 0.75 BEAT | 0.8 | 0.8 | 0.6 | 0.6 | 0 | 1 | 1 |
| | EIGHTH TRIPLET | 0.8 | 1 | 1 | 1 | 1 | 0 | 0.2 |
| | Swing | 0.5 | 1 | 1 | 1 | 1 | 0.2 | 0 |

F I G. 1 7

PERFORMANCE DATA SEARCH USING A QUERY INDICATIVE OF A TONE GENERATION PATTERN

BACKGROUND

The present invention relates generally to searching for a performance data set having a tone (i.e., sound) generation pattern that matches a query pattern input by a user, and more particularly to a tone data processing apparatus and method using such a search technique. It should be noted that the term "tone" is used herein to refer to any of all types of sounds, such as a voice, scratch sound, noise, effect sound and environmental sound as well as a musical sound.

In the field of electronic musical instruments, there has heretofore been well known a function so called "automatic accompaniment". Generally, in an automatic accompaniment, tones corresponding to component notes designated through operation of a human player or user are audibly generated in accordance with an accompaniment sequence indicated by an automatic accompaniment data set. Such an automatic accompaniment data set can include one or more melody tones and/or rhythm tones. Using such an automatic accompaniment function, even a single human player can implement a performance of abundant tones including chord tones and rhythm tones. Japanese Patent Application Laid-open Publication No. 2010-102076 (hereinafter referred to as "the relevant patent literature") discloses a technique which allows a user to search for an automatic accompaniment data set by use of any of a music piece name, artist name, album name, musical genre, tempo, musical time and other keywords and then execute a performance in time with tones based on an automatic accompaniment sequence indicated by a searched-out automatic accompaniment data set.

With the search method disclosed in the relevant patent literature, however, a considerable time and labor would be required for searching out a user-desired automatic accompaniment data set from among a multiplicity of automatic accompaniment data sets stored in a database, if sound source data contained in the database are enormous in quantity. Besides, with the search method disclosed in the relevant patent literature, it is necessary for a user to know in advance the above-mentioned information, such as a music piece name, and then input the information, and thus, the user cannot search out a desired automatic accompaniment data set intuitively and efficiently. Further, generally, automatic accompaniment data sets each comprise a combination of a plurality of performance parts, such as a bass, drum, keyboard. With the search method disclosed in the relevant patent literature, however, when a phrase of a particular performance part occurs to a user, the user cannot search out an automatic accompaniment data set using such a phrase of the particular performance part.

SUMMARY OF THE INVENTION

In view of the foregoing prior art problems, it is an object of the present invention to provide an improved technique for searching for a performance data set having a sound generation pattern that matches a query pattern input by a user. More particularly, the present invention seeks to search for an automatic-accompaniment-related sound data set having a phrase composed of a sound pattern that satisfies a predetermined condition of similarity to a sound pattern intended by a user.

In order to accomplish the above-mentioned object, the present invention provides an improved apparatus for searching through a storage device for a performance data set, the storage device storing therein a plurality of performance data sets each comprising part performance data of one or more performance parts, the part performance data of each of the performance parts including a sound generation pattern, the apparatus being coupled to an input device operable by a user, which comprises: an identification section which determines a style of operation performed by the user on the input device and identifies, on the basis of the determined style of operation, at least one of the performance parts as a search-object part; a query acquisition section which acquires a searching query pattern indicative of a sound generation pattern to be made a search object; and a search section which searches the storage device for part performance data including a sound generation pattern that not only matches the performance part identified by the identification section but also matches the searching query pattern acquired by the query acquisition section.

Preferably, the apparatus of the present invention further comprises a correspondence relationship table storing therein correspondence relationship between individual ones of said one or more performance parts and individual ones of a plurality of types of styles of operation on the input device, and the identification section identifies the at least one of the performance parts by referencing the correspondence relationship table in accordance with the determined style of operation.

Preferably, in the apparatus of the present invention, the search section further extracts, from the storage device, at least one performance data set including the part performance data searched out from the storage device.

Preferably, in the apparatus of the present invention, the query acquisition section acquires the searching query pattern in response to user's input operation for inputting a desired sound generation pattern performed via the input device.

Preferably, in the apparatus of the present invention, the input device includes a plurality of controls, and the identification section determines the style of operation by the user on the basis of whether the number of the control operated by the user within a predetermined time period is singular or plural.

Preferably, in the apparatus of the present invention, the input device includes at least one control, and the identification section determines the style of operation by the user on the basis of whether or not duration of the operation performed by the user on the control has exceeded a threshold value.

Preferably, in the apparatus of the present invention, the input device includes at least one control, and the identification section determines the style of operation by the user on the basis of whether or not intensity of the operation performed by the user on the control has exceeded a threshold value.

According to the present invention, the user can readily input a searching query with sensory operation by inputting, as a searching query pattern, a desired sound generation pattern, which is to be made an object of search or search object, in association with a search-object performance part. Further, the user can obtain a desired searched-out result fitting his or her feeling or intension.

Because a determination is made of a style of operation performed by the user on the rhythm input device, and at least one of the performance parts is identified as a search object, the user can efficiently request a search-object performance part by appropriately using limited resources of the input device in a variety of styles of operation.

The present invention may be constructed and implemented not only as the apparatus invention discussed above but also as a method invention. Also, the present invention may be arranged and implemented as a software program for execution by a processor, such as a computer or DSP, as well as a non-transitory storage medium storing such a software program. In this case, the program may be provided to a user in the storage medium and then installed into a computer of the user, or delivered from a server apparatus to a computer of a client via a communication network and then installed into the client's computer. Further, the processor used in the present invention may comprise a dedicated processor with dedicated logic built in hardware, not to mention a computer or other general-purpose processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 1 is a schematic diagram showing a general setup of a system according to an embodiment of the present invention;

FIG. 2 is a schematic view of a rhythm input device in the system of FIG. 1;

FIG. 3 is a block diagram showing an example hardware setup of an information processing device in the system of FIG. 1;

FIGS. 4A to 4C are schematic diagrams showing example content of an automatic accompaniment DB in the information processing device;

FIG. 5 is a schematic diagram showing example content of the automatic accompaniment DB in the information processing device;

FIG. 6 is a schematic diagram showing example content of the automatic accompaniment DB in the information processing device;

FIG. 7 is a block diagram showing functional arrangements of the information processing device;

FIGS. 9A to 9C are diagrams showing distribution tables of ON-set time intervals;

FIGS. 11A to 11C are diagrams showing lists of searched-out results for automatic accompaniment data;

FIG. 13 is a schematic diagram showing example content of the automatic accompaniment DB employed in modification 2;

FIGS. 15A and 15B are diagrams showing example content of a part table employed in modification 11;

FIG. 16 is a diagram showing an example of an ON-set time interval table;

FIG. 17 is a diagram showing an example of a distance reference table; and

DETAILED DESCRIPTION OF THE INVENTION

Construction of Preferred Embodiment

Figure 8:
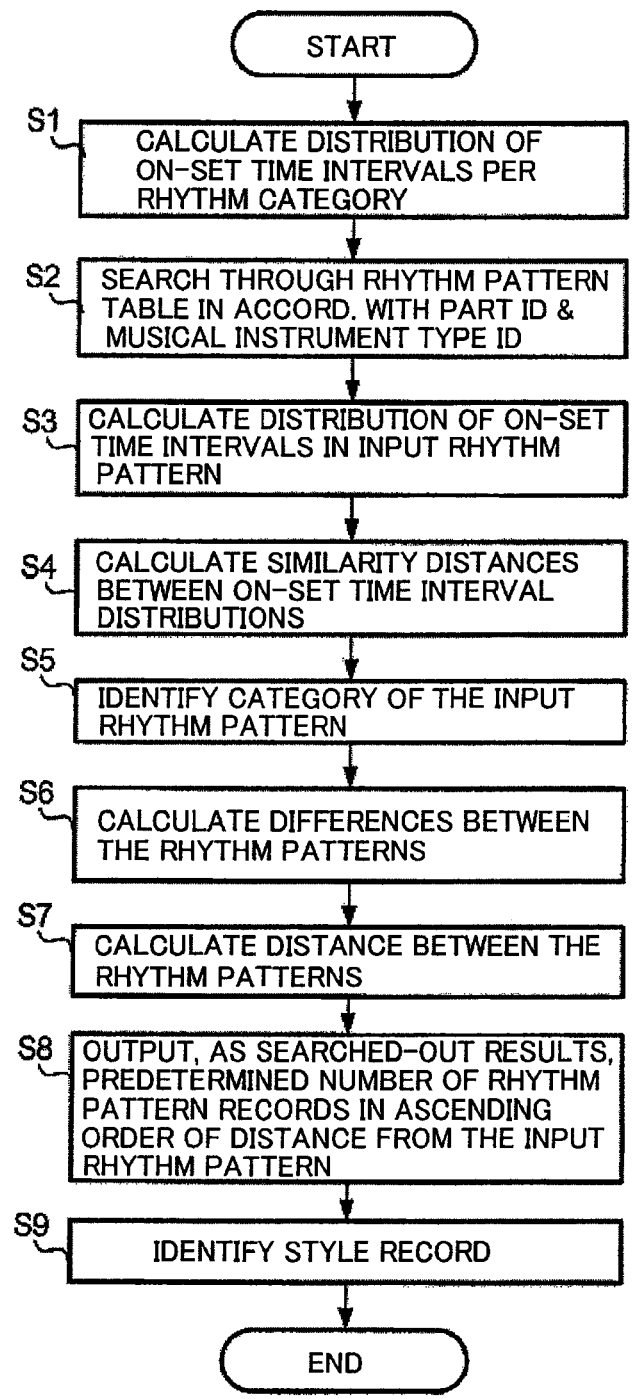
FIG. 8 is a flow chart showing an example operational sequence of search processing performed by a rhythm pattern search section and a search information processing section.

FIG. 1 is a schematic diagram showing a general setup of a tone data processing system 100 according to an embodiment of the present invention. The tone data processing system 100 includes a rhythm input device 10 and an information processing device 20, and the rhythm input device 10 and the information processing device 20 are communicatably interconnected via communication lines. The communication between the rhythm input device 10 and the information processing device 20 may be implemented in a wireless fashion. In the instant embodiment, the rhythm input device 10 includes, for example, a keyboard as an input means or section. In response to a user depressing any of keys of the keyboard provided in the rhythm input device 10, the rhythm input device 10 inputs, to the information processing device 20, trigger data indicating that any one of the keys of the keyboard has been depressed, i.e. that performance operation has been executed by the user and velocity data indicative or representative of intensity of the key depression, i.e. intensity of performance operation, on a per measure (or bar) basis. One trigger data is generated each time the user depresses any one of the keys of the keyboard, and velocity data is associated with each trigger data. A set of the trigger data and velocity data generated within each measure (or bar) represents a rhythm pattern input by the user using the rhythm input device 10 (hereinafter sometimes referred to as "input rhythm pattern"). Namely, the rhythm input device 10 is an example of an input device via which performance operation is input by the user. Also, the rhythm input device 10 is used as an operation device for the user to input a tone generation pattern, i.e., a sound generation pattern, as a searching query pattern. Alternatively, for example, as the operation device, the input device 10 may be constructed to allow the user to input a desired tone generation pattern by selecting or designating any one of a plurality of prestored accompaniment patterns.

The information processing device 20 is, for example, a PC (Personal Computer). The information processing device 20 includes a database containing a plurality of automatic accompaniment data sets. Each of the automatic accompaniment data sets comprises a plurality of performance parts each having a unique rhythm pattern. The information processing device 20 searches through the database for automatic accompaniment data sets having rhythm patterns identical or similar to a rhythm pattern input by the user via the rhythm input device 10 for a user-designated performance part, and it then displays a list of names etc. of searched-out results, i.e. searched-out automatic accompaniment data sets. Then, the information processing device 20 audibly outputs tones based on an automatic accompaniment data set selected by the user from the displayed list. At that time, the information processing device 20 repetitively reproduces tones based on the user-selected searched-out automatic accompaniment data set. Note that such a search function is turned on or off by the user operating a later-described operation section 25. Note that the automatic accompaniment data sets may be arpeggio patterns and other desired types of music performance patterns without being limited to rhythm patterns. The aforementioned database (i.e., later-described automatic accompaniment database 221) may be provided outside the information processing device 20, in which case the database may communicate with the information processing device 20 via a communication network.

FIG. 2 is a schematic view of the rhythm input device 10. The rhythm input device 10 includes, as input means, the keyboard 200 and input pads 14. Using any one of these input means, the user can input, as a searching query pattern, a desired tone generation pattern (typically, a desired rhythm pattern) that is to be made an object of search or search object. On the basis of the input search query pattern (typically, rhythm pattern), the information processing device 20 searches through a storage device (e.g., later-described automatic accompaniment database 221) having a plurality of performance data sets stored therein, a performance data set (e.g., automatic accompaniment data set) having a tone generation pattern (e.g., rhythm pattern or melody pattern) matching the input search query pattern. As well known, each automatic accompaniment data set, which is an example of a performance data set, comprises a combination of various different performance parts, such as a bass, chord, single-note-based phrase, bass drum, snare drum, high-hat and cymbals. The different performance parts are associated with predetermined ranges of the keyboard 200 and types of the input pads 14 in the rhythm input device 10. For example, the bass part is associated with a bass tone inputting keyboard range 11, and the chord part and the single-note-based phrase part are associated with a melody tone inputting keyboard range 12. Which one of the chord part and the phrase part has been designated by the user is identified by the information processing device 20 in accordance with a manner or style in which the user has executed performance operation on the melody tone inputting keyboard range 12. More specifically, if the user has depressed only one key at one time, the information processing device 20 identifies that the user has designated the phrase part, while, if the user has depressed a plurality of keys at one time, the information processing device 20 identifies that the user has designated the chord part. Further, the bass drum part is associated with the bass drum tone inputting pad 14a, the snare drum part is associated with the snare drum tone inputting pad 14b, the high-hat part is associated with the high-hat tone inputting pad 14c, and the cymbal part is associated with the cymbal drum tone inputting pad 14d. By executing performance operation designating a desired position or range of the keyboard 200 or a desired type of the input pads 14 of the rhythm input device 10, the user can search for an automatic accompaniment data set of a performance part associated with the designated input means (i.e., keyboard range or pad). Note that only one performance part may be associated with a predetermined keyboard range. For example, only the chord part may be associated with the keyboard range 12.

For example, once the user inputs a rhythm pattern by depressing keys of the bass tone inputting keyboard range 11, the information processing device 20 identifies a bass phrase having a rhythm pattern identical to or similar to the input rhythm pattern and then displays, as a searched-out result, an automatic accompaniment data set having the identified bass phrase as its component. In the following description, the bass tone inputting keyboard range 11, melody tone inputting keyboard range 12, bass drum tone inputting pad 14a, snare drum tone inputting pad 14b, high-hat tone inputting pad 14c and cymbal tone inputting pad 14d will sometimes be referred to as "performance controls", because they are operated by the user for inputting a rhythm pattern. The terms "operation style", "style of operation by the user", "user's operation style" and the like are used herein to refer to a style in which the user operates any of the performance controls, such as a style as to whether the user operates just one of the performance controls or two or more of the performance controls (i.e., the number of control operated by the user is singular or plural), duration or intensity of the performance operation, or the like. Once the user operates any of the performance controls on the rhythm device 10, the rhythm input device 10 inputs, to the information processing device 20, information of the MIDI (Musical Instrument Digital Interface) format (hereinafter referred to as "MIDI information"). Such MIDI information includes, in addition to the above-mentioned trigger data and velocity data, one or more note numbers if the operated performance control is the keyboard, or a channel number if the operated performance control is one of the input pads. The information processing device 20 identifies, from the received MIDI information, a performance part for which a search is to be performed (i.e., search-object performance part or search-object part).

FIG. 3 is a block diagram showing an example hardware setup of the information processing device 20. The information processing device 20 includes a control section 21, a storage section 22, an input/output interface section 23, a display section 24, the operation section 25 and a sound output section 26, which are interconnected via a bus. The control section 21 includes a CPU (Central Processing Unit), a ROM (Read-Only Memory), a RAM (Random Access Memory), etc. The CPU reads out an application program stored in the ROM or storage section 22, loads the read-out application program into the RAM, executes the loaded application program, and thereby controls the various sections via the bus. Further, the RAM functions as a working area to be used by the CPU, for example, when processing data.

The storage section 22 includes the automatic accompaniment database (DB) 221 which contains (stores therein) a plurality of performance data sets. Each of the performance data sets (e.g., automatic accompaniment data sets) comprises part performance data of a plurality of performance parts, and the part performance data for each of the performance parts include a tone generation pattern (rhythm pattern or melody pattern) and tone data corresponding to the tone generation pattern. As an example, the automatic accompaniment database 221 stores therein at least some of the automatic accompaniment data sets in a MIDI information format. The input/output interface section 23 not only inputs data, output from the rhythm input device 10, to the information processing device 20, but also outputs, in accordance with instructions given by the control section 21, various signals to the input device 10 for controlling the rhythm input device 10. The display section 24 is, for example, in the form of a visual display which displays a dialog screen etc. to the user. The operation section 25 is, for example, in the form of a mouse/keyboard unit which receives and supplies signals, responsive to operation by the user, from and to the control section 21. The control section 21 controls various sections in accordance with the signals received from the operation section 25. The sound output section 26 includes a DAC (Digital-to-Audio Converter), amplifier and speaker. The sound output section 26 converts digital tone data based on MIDI information, searched out by the control section 21 from the automatic accompaniment DB 221, into analog tone data by means of the DAC, amplifies the analog tone data by means of the amplifier and then audibly outputs tones, corresponding to the amplified analog sound signal, by means of the speaker.

FIGS. 4A to 4C, 5 and 5 are schematic diagrams showing example content of the automatic accompaniment DB 221. The automatic accompaniment DB 221 contains a part table, a musical instrument type table, a rhythm category table, a rhythm pattern table and a style table. FIG. 4A shows an example of the part table. "part ID" in FIG. 4A is an identifier uniquely identifying a performance part constituting a tone data set, and it is represented, for example, by a 2-digit number. "part" is a name indicative of a type of a performance part. Different part IDs are described in the part table in association with the individual performance parts, "bass", "chord", "phrase", "bass drum", "snare drum", "high-hat" and "cymbals". "note number" is MIDI information indicating which one of key ranges of the keyboard 200 a performance part is allocated to. According to the MIDI information, note number "60" is allocated to "middle C" of the keyboard. With note number "60" used as a basis, note numbers equal to and smaller than a threshold value "45" are allocated to the "bass" part, and note numbers greater than the threshold value "45" are allocated to the "chord" and "phrase" parts. Note that the above-mentioned threshold value is just illustrative and may be changed as necessary by the user.

In the following description, the term "number of control" is used to refer to the number of control operated at one time by the user. For example, the "number of control" is plural, i.e. two or more, for the "chord" part, because, for the "chord" part, a plurality of controls (keyboard keys in this case) are depressed or operated at one time by the user. Further, "channel information" is MIDI information indicating which one of the input pads a performance part is allocated to. In the illustrated example 4A, channel information "14*a*" is allocated to the "bass drum" part, channel information "14*b*" is allocated to the "snare drum" part, channel information "14*c*" is allocated to the "high-hat" part, and channel information "14*d*" is allocated to the "cymbal" part. Namely, the part table in the automatic accompaniment DB 221 is an example of a table storing predetermined correspondence relationship between the individual performance parts and the individual controls on the input device 10, and/or between the individual performance parts and the individual styles of operation performed by the user on the controls.

FIG. 4B shows an example of the musical instrument type table. "part ID" is the same as described above in relation to FIG. 4A. "musical instrument type ID" is an identifier uniquely identifying a type of a musical instrument, and the "musical instrument type ID" is represented, for example, by a three-digit number. "musical instrument type" is a name indicative of a type of a musical instrument. For example, different musical instrument type IDs are described in the musical instrument type table in association with individual musical instrument types, such as "wood bass", "electric bass" and "slap bass". For example, the musical instrument type "wood bass" is described in the musical instrument type table in association with musical instrument type ID "001". Similarly, the other musical instrument types are described in the musical instrument type table in association with their respective musical instrument type IDs. Note that the musical instrument types shown in FIG. 4B are just illustrative and any other musical instrument types may be described. Note that, in the instant embodiment, the "musical instrument type" is synonymous with tone color data (tone color ID).

FIG. 4C shows an example of the rhythm category table. "rhythm category ID" is an identifier uniquely identify a category of a rhythm pattern (herein also referred to as "rhythm category"), and each "rhythm category ID" is represented, for example, by a two-digit number. Here, each rhythm pattern represents a series of times at which individual notes are to be audibly generated within a time period of a predetermined time length. Particularly, in the instant embodiment, each "rhythm pattern" represents a series of times at which individual notes are to be audibly generated within a measure (bar) that is an example of the predetermined time period. "rhythm category" is a name indicative of a rhythm category, and a plurality of unique rhythm category IDs are described in the rhythm category table in association with individual rhythm categories, such as "eighth", "sixteenth" and "eighth triplet". For example, the "eighth" rhythm category is described in the rhythm category table in association with rhythm category ID "01". Note that the rhythm categories shown in FIG. 4C are just illustrative and any other rhythm categories may be used or described. For example, there may be employed rougher categorization into beats or genres, or finer categorization achieved by assigning a separate category ID to each rhythm pattern.

FIG. 5 shows an example of the rhythm pattern table. In the rhythm pattern table, a plurality of grouped rhythm pattern records (part performance data) are described for each part ID that uniquely identifies a performance part. In FIG. 5, a plurality of rhythm pattern records of the "bass" part (part ID "01") are shown, as an example of the rhythm pattern table. Each of the rhythm pattern records (part performance data) includes a plurality of items, such as "part ID", "musical instrument type ID", "rhythm pattern ID", "rhythm category ID", "rhythm pattern data" and "attack intensity pattern data". As noted above, "musical instrument type ID" is an identifier uniquely a musical instrument type. Rhythm pattern records having the same part ID are grouped per musical instrument type ID, and the user can select a musical instrument type by use of the operation section 25 before inputting a rhythm by use of the input device 10. The musical instrument type selected by the user is stored into the RAM. "rhythm pattern ID" is an identifier uniquely identifying a rhythm pattern record, and it is, for example, in the form of a four-digit number. "rhythm category ID" is an identifier identifying which one of the rhythm categories a rhythm pattern record belongs to. In the illustrated example of FIG. 5, the rhythm pattern record of which the "rhythm category ID" is "01" belongs to the "eighth" (i.e., eight-note) rhythm category as indicated in the rhythm category table shown in 4C.

"rhythm pattern data" includes a data file having recorded therein sound generation start times of individual component notes of a phrase constituting one measure; for example, the data file is a text file having the sound generation start times of the individual component notes described therein. In a later-described matching operation, the sound generation start times in the rhythm pattern data are associated with trigger data included in an input rhythm pattern (query pattern input for a search purpose which will hereinafter be referred to also as "searching query pattern") and indicating that performance operation has been executed by the user. Here, the sound generation start time of each of the component notes is normalized in advance using the length of one measure as a value "1". Namely, the sound generation start time of each of the component notes described in the rhythm pattern data takes a value in the range from "0" to "1". In the illustrated example, a tone data (waveform data) set corresponding to a rhythm pattern (tone generation pattern) is stored in another storage area than the rhythm pattern, and the tone data (waveform data) set is identified by the musical instrument type ID of the same performance part. Alternatively, the tone data (waveform data) set corresponding to a rhythm pattern (tone generation pattern) as well as the rhythm pattern (tone generation pattern) may be stored as "rhythm pattern data" in the rhythm pattern table. In such a case, the rhythm pattern data comprises audio data of any one of various sound file formats as will be later described. Further, a tone data (waveform data) set may be stored separately for each of the performance parts, or, as another example, tone data (waveform data) sets of a plurality of performance parts (e.g., all of performance parts constituting a "style") may be stored together as a single file.

The rhythm pattern table and related tone data storage area contained in the automatic accompaniment DB 221 correspond to the storage device that stores tone generation patterns (rhythm patterns) and tone data sets, corresponding to the tone generation patterns (rhythm patterns), in association with the individual performance parts. Each of the rhythm patterns is a generation pattern of a plurality of tones within a time period (one measure in this case) of a predetermined time length, which represents a series of sound generation times at which the individual notes are to be audibly generated within the time period.

The rhythm pattern data may be created in advance in the following manner. A person or human operator who wants to create rhythm pattern data extracts component note start times from a commercially available audio loop material. Then, the human operator removes, from the extracted component note start times, unnecessary component note start times, such as those of ghostnotes, within an ignorable range. Data having such unnecessary component note start times removed therefrom may be used as rhythm pattern data.

The rhythm pattern data may be extracted from a commercially available audio loop material by automatically removing ghostnotes from the material, rather than being limited to the above-mentioned scheme or method where the rhythm pattern data are created by the human operator removing ghostnotes from the commercially available audio loop material. For example, in a case where data from which rhythm pattern data are extracted are in the MIDI format, rhythm pattern data may be created by a computer in the following manner. A CPU of the computer extracts generation start times of channel-specific component notes from the MIDI-format data for one measure and removes ghostnotes (such as those having extremely small velocity data) that are difficult to be judged as rhythm inputs. Then, if there are a plurality of inputs, like chord inputs, within a predetermined time period in the MIDI-format data having the ghostnotes removed therefrom, then the CPU of the computer automatically creates rhythm pattern data by performing a process for organizing or combining the plurality of inputs into one rhythm input.

Further, for the drum parts, sounds of a plurality of musical instruments, such as the bass drum, snare drum and cymbals may sometimes exist within one channel. In such a case, the CPU of the computer extracts rhythm pattern data in the following manner. Further, for the drum parts, musical instrument sounds are, in many cases, fixedly allocated in advance to various note numbers. Let it be assumed here that a tone color of the snare drum is allocated to note number "40". On the basis of such assumption, the CPU of the computer extracts, in the channel having recorded therein the drum parts of the accompaniment sound sources, rhythm pattern data of the snare drum by extracting sound generation start times of individual component notes of the note number to which the tone color of the snare drum is allocated.

Alternatively, in the case where sounds of a plurality of musical instruments, such as the bass drum, snare drum and cymbals, exist within one channel, the sounds may be divided into a plurality of parts in accordance with pitch ranges rather than in accordance with the musical instrument types. For example, sound signals of the channel, having recorded therein the drum parts of the accompaniment sound sources, may be divided into three pitch ranges, i.e. low, medium and high pitch ranges, to extract sound signals of three parts (pitch range parts), and then a rhythm pattern (tone generation pattern) may be extracted from the thus-extracted sound signal of each of the pitch range parts.

"attack intensity pattern data" is a data file having recorded therein attack intensity of individual component notes of a phrase constituting one measure; for example, the attack intensity pattern data is a text file having the sound generation start times of the individual component notes described therein as numerical values. The attack intensity corresponds to velocity data included in an input rhythm pattern and indicative of intensity of user's performance operation. Namely, each attack intensity represents an intensity value of a component note of a phrase. The attack intensity may be described in a text file as velocity data itself of MIDI information. FIG. 5 mainly shows, by way of example, a rhythm pattern record of the "bass" part. In effect, however, rhythm pattern records corresponding to a plurality of types of performance parts, such as chord, phrase, bass drum, snare drum, high-hat and cymbals, are described in the rhythm pattern table, as partly shown in FIG. 5.

FIG. 6 shows an example of a style table. In a case where there are a plurality of different types of automatic accompaniments, the term "style" not only identifies the individual automatic accompaniment types but also uniquely identifies each of automatic accompaniments of a same type. In the style table are stored a plurality of style records each associating, per style, information of individual performance parts, constituting an automatic accompaniment, with one another. FIG. 6 shows a plurality of style records whose musical genre name is "JAZZ" Each of the style records comprises a plurality of items, such as "style ID", "genre name", "style name", "key", "BPM (Beats Per Minute)", "bass rhythm pattern ID", "chord rhythm pattern ID", "phrase rhythm pattern ID", "bass drum rhythm pattern ID", "snare drum rhythm pattern ID", "high-hat rhythm pattern ID" and "cymbal rhythm pattern ID". The "style ID" is and ID uniquely identifying a style record, the "genre name" indicates a musical genre which a style record belongs to, the "style name" is a name uniquely identifying a style record, the "key" indicates a musical key of a style record, and the "BPM" indicates a tempo at which notes based on a style record are to be reproduced.

In each of the style records, part-specific rhythm patterns are stored in one-to-one association with all of the aforementioned performance parts. In the illustrated example of FIG. 6, the style record of style ID "0001" has a value "0001" as the "bass rhythm pattern ID", which means that a rhythm pattern record whose part ID is "01" (bass) and rhythm pattern ID is "0001" and whose rhythm pattern data is "WoodBass1Rhythm.txt" and a style record whose style ID is "0001" are associated with each other in the rhythm pattern table. In each of the style records, similar associations are described for rhythm patterns of the other performance parts than the bass part.

Because the automatic accompaniment DB 221 is constructed in the aforementioned manner, the user can perform the following search. Namely, once the user inputs a rhythm pattern by operating any of the performance controls, or in a given operation style, that corresponds to a given performance part on the rhythm input device 10, the information processing device 20 identifies at least one rhythm pattern record from the rhythm pattern table on the basis of the performance part associated with the operated performance control or operation style and the input rhythm pattern. Then, the information processing device 20 searches through the style table, on the basis of the part ID and rhythm pattern ID of the identified rhythm pattern record, to extract one or more style records including the identified rhythm pattern record as one of its performance parts and displays the extracted one or more style records on the display section 24. Then, once the user selects a desired one of the displayed style records, a tone data set based on the selected style record (i.e., automatic accompaniment data set) is audibly output as sounds or tones by means of the sound output section 26. Namely, by inputting a desired search-object rhythm pattern (tone generation pattern) as a query pattern (searching query pattern) in association with a search-object performance part, the user can readily input a searching query through intuitive operation of the user and obtain a desired searched-out result (automatic accompaniment) fitting or matching a feeling or intention of the user.

FIG. 7 is a block diagram showing functional arrangements of the above-mentioned information processing device 20. The control section 21 performs respective functions of a bar line clock output section 211, input rhythm pattern storage section 212, part identification section 213, rhythm pattern search section 214, search information processing section 215 and reproduction control section 216. Although the following describe various processing as being performed by the above-mentioned various sections, a main component that performs the processing is, in effect, the control section 21. In the following description, the term "ON-set" means that the input state of the rhythm input device 10 has been switched or changed from OFF to ON. For example, the term "ON-set" means that a pad has been hit if the pad is an input section or means of the rhythm input device 10, that a key has been depressed if the keyboard is the input means of the rhythm input device 10, or that a button has been depressed if the button is the input means of the rhythm input device 10. Further, in the following description, the term "ON-set time" indicates a time point at which the input state of the rhythm input device 10 has been changed from OFF to ON. In other words, the "ON-set time" indicates a time point at which trigger data has occurred (or has been generated) in the rhythm input device 10. Further, in the following description, "ON-set information" is information input from the rhythm input device 10 to the information processing device 20 at the ON-set time. The "ON-set information" includes, in addition to the above-mentioned trigger data, a note number of the keyboard, channel information, etc.

The bar line clock output section 211 outputs, to the input rhythm pattern storage section 212 once every several dozens of msec (milliseconds), data indicating where in a measure the current time is located on an advancing time axis, as a clock signal (hereinafter referred to as "bar line clock signal"). Namely, assuming that a length of one measure is normalized as a value "1", the bar line clock signal takes a value in the range from "0" to "1". The bar line clock output section 211 generates such bar line clock signals on the basis of a BPM designated by the user via the operation section 25. Then, on the basis of the bar line clock signals, the input rhythm pattern storage section 212 stores, into the RAM, time points at which trigger data have occurred (i.e. ON-set times), on a per measure basis. A series of ON-set times thus stored in the RAM per measure constitutes an input rhythm pattern (i.e., searching query pattern). Because each of the ON-set times stored in the RAM is based on the bar line clock signals, it takes a value in the range from "0" to "1" just like the bar line clock signals. Namely, the bar line clock output section 211 is an example of a time-passage or time-lapse notification section for not only causing the time within a time period of a predetermined time length (one measure in this case) to progress but also informing or notifying the user of the passage or lapse of the time within the predetermined time period. The bar line clock output section 211, reproduction control section 216 and sound output section 26 together constitute a notification section that notifies the user of a tempo for assisting the user in inputting a searching query pattern. Further, the input rhythm pattern storage section 212 is an example of an acquisition section for acquiring a tone generation pattern (searching query pattern) that has been input by the user for a designated performance part (search-object part) while the time is being caused by the bar line clock output section 211 to lapse within the time period of the predetermined length (one measure in this case) (i.e. while the time period of the predetermined length is caused to progress by the bar line clock output section 211), and that is indicative or representative of a series of sound generation times (ON-set times) of individual notes. The time period of the predetermined length caused to progress by the bar line clock output section 211 may be repeated or need not be repeated. Alternatively, bar line clock signals input from an external source to the information processing device 20 may be used as the above-mentioned bar line clock signals.

Further, a time point at which a bar line starts has to be fed back from the information processing device 20 to the user so that the user can accurately input a rhythm pattern per measure. For that purpose, it is only necessary that the position of the bar line be visually or audibly indicated to the user by the information processing device 20 generating a sound or light at the time of each measure and/or beat, for example, like a metronome. Alternatively, the reproduction control section 216 may reproduce an accompaniment sound source, having the position of each bar line added thereto in advance, in accordance with the bar line clock signal. In such a case, the user inputs a rhythm pattern in accordance with a bar line felt by the user from the reproduced accompaniment sound source.

The part identification section 213 determines, on the basis of ON-set information (particularly MIDI information) input from the rhythm input device 10 and the part table included in the automatic accompaniment DB 221, which of the performance controls has been operated by the user, i.e. which of a plurality of performance parts, constituting a tone data set, has been designated by the user for rhythm pattern input. More specifically, if the received MIDI information is indicative of a note number, the part identification section 213 compares the received note number and the described content of the part table to thereby determine whether the user's operation has been performed on the bass tone inputting keyboard range 11 or on the melody tone inputting keyboard range 12. When the part identification section 213 determines that the user's operation has been performed on the melody tone inputting keyboard range 12, it further determines, on the basis of the user's operation style, which one of the "chord" and "phrase" parts the user has designated. More specifically, if a plurality of note numbers are contained in MIDI information received within a predetermined time period (e.g., 100 ms), the part identification section 213 determines that the user's operation style is one handling a plurality of performance controls and thereby identifies that the user has designated the "chord" part. Conversely, if only one note number is contained in MIDI information received within the predetermined time period, the part identification section 213 determines that the user's operation style is one handling a single performance control and thereby identifies that the user has designated the "phrase" part. Further, if the received MIDI information is channel information, the part identification section 213 compares the received channel information and the described content of the part table to thereby determine on which of the bass drum input pad 14a, snare drum input drum 14b, high-hat input pad 14c and cymbal input pad 14d the user's operation has been performed. The part identification section 213 outputs, to the rhythm pattern search section 214, the part ID corresponding to the identified performance part. Note that the part identification section 213 can identify not only one performance part but also a plurality of performance parts as object-of-search or search-object performance parts.

The rhythm pattern search section 214 searches through the rhythm pattern table of the automatic accompaniment DB 221 on the basis of the input rhythm pattern (query pattern) stored in the RAM, and it not only stores, into the RAM, rhythm pattern records including rhythm pattern data having a high degree of similarity to the input rhythm pattern, but also outputs such rhythm pattern records to the search information processing section 215. Namely, the rhythm pattern search section 214 searches through the storage device (automatic accompaniment DB 221) for rhythm patterns that not only match the designated or identified performance part but also matches the query pattern. The search information processing section 215 searches through the style table on the basis of the part ID and rhythm pattern ID included in each of the input rhythm records and stores searched-out style records into the RAM. The searched-out style records each includes, in addition to data indicative of accompaniment sound sources themselves, information related to the accompaniment sound sources, such as a "genre name", "style name", "key" and "BPM". The search information processing section 215 displays such information related to the accompaniment sound sources on the display section 24. The search information processing section 215 can further perform a narrowing-down search on the searched-out style records on the basis of the "BPM" and "musical instrument type ID" designated by the user via the operation section 25. Namely, the rhythm pattern search section 214 and the search information processing section 215 are an example of a search section for searching for a tone data set associated with a rhythm pattern that satisfies a condition of presenting a high degree of similarity to the tone pattern or rhythm pattern acquired by the input rhythm pattern storage section 212 as the acquisition section for the identified performance part. The reproduction control section 216 sets the searched-out style record as an object of reproduction and supplies a tone data set, based on the style record, to the sound output section 26 in synchronism with the bar line clock signals. Then, the sound output section 26 audibly generates tones based on the tone data set.

Because the rhythm pattern data are in the MIDI format, the user can change, via the operation section 25, the BPM (Beats Per Minute) which the tone data set includes as a part of the data and which is indicative of a tempo at which the tone data set is to be reproduced. In this case, the reproduction control section 216 supplies the tone data set, based on the style record, to the sound output section 26 in synchronism with the bar line clock signals with the changed BPM. Further, even in the case where the rhythm pattern data is audio data in a sound file format, such as the WAVE (RIFF Waveform Audio Format) or mp3 (MPEG Audio Layer-3), the user can change the BPM (Beats Per Minute), at which the tone data set is to be reproduced, if the reproduction control section 216 has a time-stretch function for changing a tempo without changing tone pitches. As apparent from the foregoing, the information processing device 20 is an example of a tone data processing device which outputs, as a searched-out result, an automatic-accompaniment-related tone data set having a phrase composed of a rhythm pattern that satisfies a predetermined condition of a degree of similarity to a user-intended rhythm pattern for a user-designated performance part.

<Behavior>

Next, with reference to FIGS. 8 to 10, a description will be given about a series of operations performed by the rhythm pattern search section 214 and the search information processing section 215 for detecting a particular style record from the style table on the basis of an input rhythm pattern while the search function is ON.

FIG. 8 is a flow chart showing an example operational sequence of search processing performed by the rhythm pattern search section 214 and search information processing section 215. At next step S1, the rhythm pattern search section 214 calculates a distribution of ON-set time intervals per rhythm category, using all rhythm patterns described in the input rhythm pattern table. In the rhythm pattern data of each of the rhythm pattern records are contained tone or sound generation start times, i.e. ON-set times, of individual component notes normalized with the length of one measure as "1". The ON-set time intervals are each an interval between a pair of adjoining ON-set times on the time axis and represented by a numerical value in the range from "0" to "1". Further, assuming that one measure is divided into 48 equal time segments, the distribution of the ON-set time intervals can be represented by the numbers of the ON-set time intervals corresponding to the individual time segments. The reason why one measure is divided into 48 equal time segments is that, if each beat is divided into 12 equal time segments assuming a quadruple-time rhythm, then there can be achieved resolution suitable for identification among a plurality of different rhythm categories, such as eighth, eighth triplet and sixteenth. Here, the "resolution" is determined by a note of the shortest length that can be expressed by sequence software, such as a sequencer or the application program employed in the instant embodiment. In the instant embodiment, the resolution is "48" per measure, and thus, one quarter note is dividable into 12 segments.

In the following description about the input rhythm pattern too, the term "ON-set time interval" is used in the same meanings as for the rhythm pattern record. Namely, in the input rhythm pattern, each interval between a pair of adjoining ON-set times on the time axis represents an ON-set time interval. The distribution of ON-set time intervals calculated at step S1 above per rhythm category is compared against a distribution of ON-set time intervals in the input rhythm pattern calculated at later-described step S3. The reason why the ON-set time interval distribution is calculated at step S1 at the beginning of the flow chart is that the ON-set time interval distribution calculated at step S1 is constant and thus, once calculated, it need not be calculated again. Therefore, the ON-set time interval distribution calculation of step S1 may be performed upon powering-on of the information processing device 20 or upon start-up of the search processing. Further, data indicative of the ON-set time interval distribution calculated at step S1 may be prestored in the ROM or the like so that the control section 21 reads out that data upon start-up of the search processing.

The following describe, using specific values of the ON-set times, how the distribution of the ON-set time intervals is calculated at step S1. Let it be assumed here that an eighth rhythm pattern as indicated in item (i) below is described in rhythm pattern data of a rhythm pattern record.

(i) 0, 0.25, 0.375, 0.5, 0.625, 0.75 and 0.875

On the basis of the input rhythm pattern indicated in item (i) above, the rhythm pattern search section 214 calculates ON-set time intervals as indicated in item (ii) below.

(ii) 0.25, 0.125, 0.125, 0.125, 0.125 and 0.125

Then, the rhythm pattern search section 214 calculates a group of values as indicated in item (iii) below by multiplying each of the ON-set time intervals, calculated at (ii) above, by a value "48", then adding "0.5" to the resultant product and then rounding down digits after the decimal point of the resultant sum (i.e., "quantizing process").

(iii) 12, 6, 6, 6, 6 and 6

Here, "quantizing process" means that the rhythm pattern search section 214 corrects each of the ON-set time intervals in accordance with the resolution. The reason why the quantizing is performed is as follows. The sound generation times described in the rhythm pattern data in the rhythm pattern table are based on the resolution ("48" in this case). Thus, if the rhythm pattern table is searched using the ON-set time intervals, accuracy of the search would be lowered unless the ON-set time intervals to be used for the search are also based on the resolution. For this reason, the rhythm pattern search section 214 performs the quantizing process on each of the ON-set time intervals indicated in item (ii) above.

Let's consider a case where two eighth rhythm patterns, two sixteenth rhythm patterns and two eighth triplet rhythm patterns are described in rhythm pattern data of individual rhythm pattern records as follows:

Eighth Rhythm Category
(A) 0, 0.25, 0.375, 0.5, 0.625, 0.75 and 0.875, and
(B) 0, 0.121, 0.252, 0.37, 0.51, 0.625, 0.749 and 0.876;
Sixteenth Rhythm Category
(C) 0, 0.125, 0.1875, 0.251, 0.374, 0.4325, 0.5, 0.625, 0.6875, 0.75, 0.876 and 0.9325, and
(D) 0, 0.625, 0.125, 0.1875, 0.251, 0.3125, 0.375, 0.4325, 0.5, 0.5625, 0.625, 0.6875, 0.75, 0.8125, 0.875 and 0.9325; and
Eighth Triplet Rhythm Category
(E) 0, 0.8333, 0.1666, 0.25, 0.3333, 0.4166, 0.5, 0.5833, 0.6666, 0.75, 0.8333 and 0.91666, and
(F) 0, 0.1666, 0.25, 0.333, 0.4166, 0.5, 0.6666, 0.75, 0.8333 and 0.91666.

The rhythm pattern search section 214 calculates a distribution of ON-set time intervals for each of the rhythm categories, using a calculation scheme, similar to the aforementioned, for the patterns indicated in (A)-(F) above. FIG. 9A shows a distribution table to which are allocated distributions of ON-set time intervals calculated by the rhythm pattern search section 214 for the individual rhythm categories.

At step S2 following step S1, the rhythm pattern search section 214 searches through the rhythm pattern table in accordance with the part ID input from the part identification section 213 and musical instrument type ID stored in the RAM. Note that the musical instrument type ID is an ID stored in the RAM by the user previously designating a musical instrument type via the operation section 25. However, the designation of a musical instrument type is not necessarily essential; if no musical instrument type has been designated, the rhythm pattern search section 214 searches through the rhythm pattern table only in accordance with the input part ID. In subsequent processes, the rhythm pattern search section 214 uses, as an object of processing, a rhythm pattern record searched out at step S2.

As stated above, the input rhythm pattern includes ON-set times normalized with the length of one measure as a value "1". At step S3 following step S2, the rhythm pattern search section 214 calculates a distribution of ON-set time intervals in the input rhythm pattern, using the same calculation scheme as at step S1. For the input rhythm pattern, which has a rhythm pattern as indicated in item (i) above, ON-set time intervals are calculated as indicated in item (ii), and then, a group of numerical values is calculated as indicated in item (iii). FIG. 9B shows a distribution table to which are allocated a distribution of ON-set time intervals calculated by the rhythm pattern search section 214 for the input rhythm pattern.

The following further describe distributions of ON-set time intervals, with reference to distribution tables shown in FIGS. 9A to 9C. FIG. 9B is a distribution table of the ON-set time intervals in the input rhythm pattern. In FIG. 9B, the horizontal axis represents time intervals in the case where one measure is divided into 48 time segments, while the vertical axis represents ratios in the numbers of quantized ON-set time intervals ("number ratios"). Further, in FIG. 9B, the group of numerical values based on the input rhythm pattern indicated in tem (iii) above is allocated to the distribution table. The number ratios are normalized by the rhythm pattern search section 214 such that a sum of the number ratios becomes "1" (one). From FIG. 9B, it can be seen that a peak of the distribution is in time interval "6" that is the greatest in number in the group of numerical values of item (iii) that are quantized ON-set time intervals.

At step S4 following step S3, the rhythm pattern search section 214 calculates distances indicative of degrees of similarity (hereinafter referred to also as "similarity distances") between the distribution of ON-set time intervals based on the rhythm patterns of the individual rhythm categories described in the rhythm pattern table and the distribution of ON-set time intervals based on the input rhythm pattern by use of the distribution tables of FIGS. 9A and 9B. FIG. 9C shows a distribution table indicative of differences between the distribution of ON-set time intervals based on the rhythm patterns of the individual rhythm categories described in the rhythm pattern table (FIG. 9A) and the distribution of ON-set time intervals based on the input rhythm pattern (FIG. 9B). The similarity distance calculation at step S4 may be performed in the following manner. First, the rhythm pattern search section 214 calculates, for each same time interval in both the distribution table of ON-set time intervals based on the rhythm patterns of the individual rhythm categories described in the rhythm pattern table and the distribution table of ON-set time intervals based on the input rhythm pattern, absolute values of differences in the number ratio between the two tables. Then, the rhythm pattern search section 214 calculates, for each of the rhythm categories, a square root of a sum obtained by adding up the absolute values calculated for the individual time intervals. The value of the thus-calculated square root indicates the above-mentioned similarity distance. A smaller value of the similarity distance represents a higher degree of similarity, while a greater value of the similarity distance represents a lower degree of similarity. In the illustrated example of FIG. 9C, the eighth rhythm category presents the smallest difference in the number ratio based on the distribution tables of FIGS. 9A and 9B, which means that, of the eighth, sixteenth and eighth triplet rhythm categories represented in the distribution tables, the eighth rhythm category has the smallest similarity distance to the input rhythm pattern.

At step S5 following step S4, the rhythm pattern search section 214 determines that, of the rhythm categories described in the rhythm pattern table, one presenting the smallest similarity distance is the rhythm category the input rhythm pattern falls in or belongs to. More specifically, at this step, the rhythm pattern search section 214 identifies that the input rhythm pattern falls in or belongs to the eighth rhythm category. Namely, through the operations of steps S2 to S5 above, the rhythm pattern search section 214 identifies a particular rhythm category which the input rhythm pattern is highly likely to fall in.

Then, at step S6, the rhythm pattern search section 214 calculates levels of differences between all of the rhythm patterns described in the rhythm pattern table and the input rhythm pattern, in order to identify, from among the rhythm patterns described in the rhythm pattern table, a rhythm pattern that presents a high degree of similarity to the input rhythm pattern. Here, the "levels of differences" indicate how much the individual ON-set time intervals in the input rhythm pattern and the individual ON-set time intervals of the individual rhythm patterns described in the rhythm pattern table are distant from each other. Namely, smaller levels of the differences between the input rhythm pattern and any one of the rhythm patterns described in the rhythm pattern table indicate a higher degree of similarity between the input rhythm pattern and the one rhythm pattern described in the rhythm pattern table.

Namely, while the rhythm pattern search section 214 identifies a rhythm category highly likely to match the input rhythm pattern in the operations up to step S5, it handles, as objects of calculation, the rhythm pattern records belonging to all of the rhythm categories in the operation of step S6. The reason for this is as follows. Among the rhythm pattern data included in the rhythm pattern records, there may be rhythm pattern data for which it is hard to clearly determine which one of the rhythm categories the rhythm pattern data belongs to, such as rhythm pattern data where substantially the same numbers of eighth ON-set time intervals and sixteenth ON-set time intervals exist in one and the same measure. In such a case, the possibility of a user's intended rhythm pattern being detected accurately would be advantageously enhanced by the rhythm pattern search section 214 handling, as objects of calculation, the phrase records belonging to all of the rhythm categories at step S6 as noted above.

Figures 10, 12:
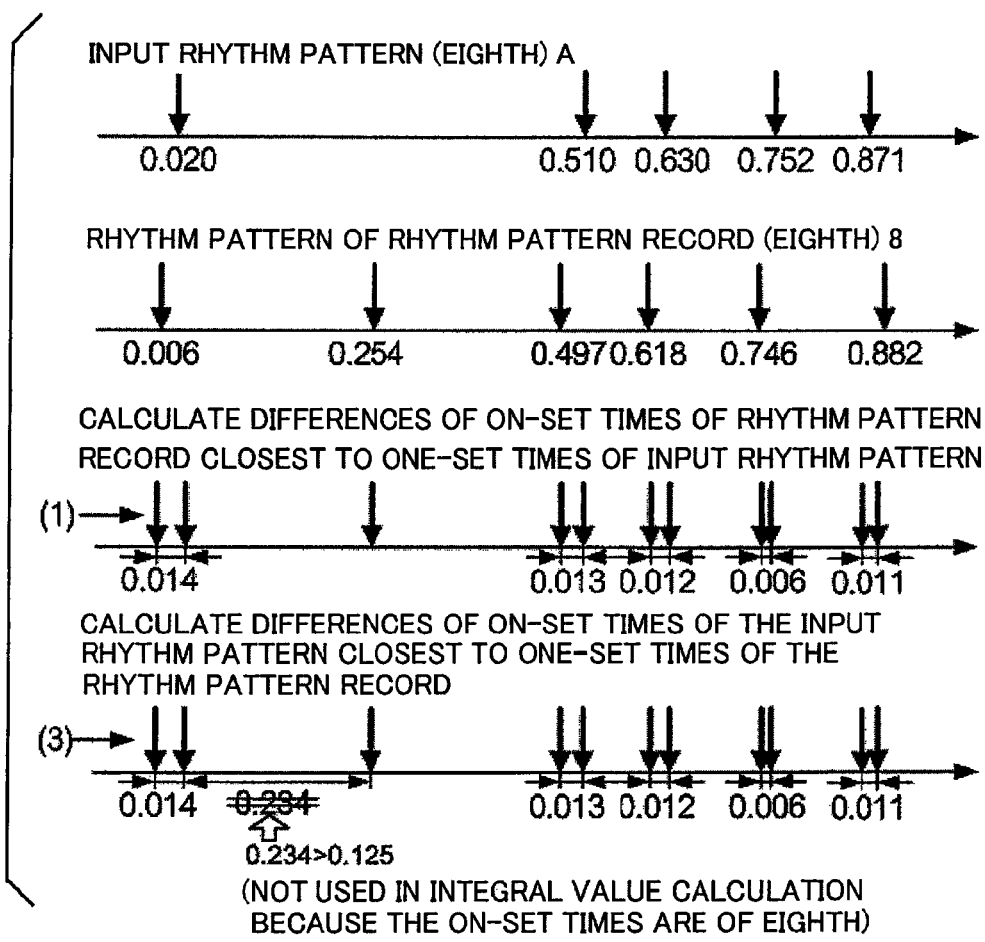
FIG. 10 is a schematic diagram explanatory of calculation of a difference between rhythm patterns.
FIG. 12 is a schematic diagram showing example content of the automatic accompaniment DB employed in modification 2.

The following describe in greater detail the operation of step S6, with reference to FIG. 10. FIG. 10 is a schematic diagram explanatory of calculation of a difference between rhythm patterns. As shown in FIG. 10, the input rhythm pattern is depicted by "A", and the rhythm pattern described in the rhythm pattern record is depicted by "B". A level of a difference between the input rhythm pattern A and the rhythm pattern B is calculated in the following manner.

(1) The rhythm pattern search section 214 calculates absolute values of differences between the ON-set times of the input rhythm pattern A and the ON-set times of the rhythm pattern B that are closest to corresponding ones of the ON-set times of the input rhythm pattern A ((1) of FIG. 10); in other words, the absolute values of differences are calculated on the basis of the individual ON-set times of the input rhythm pattern A, or using the ON-set times of the input rhythm pattern A as calculation bases.

(2) Then, the rhythm pattern search section 214 calculates an integrated value of the absolute values calculated in (1) above.

(3) Then, the rhythm pattern search section 214 calculates absolute values of differences between the individual ON-set times of the rhythm pattern B and the ON-set times of the input rhythm pattern A that are closest to corresponding ones of the ON-set times of the rhythm pattern B ((3) of FIG. 10), in other words, the absolute values of differences are calculated on the basis of the individual ON-set times of the rhythm pattern B, or using the ON-set times of the rhythm pattern B as calculation bases.

(4) The rhythm pattern search section 214 calculates an integrated value of the absolute values calculated in (3) above.

(5) Then, the rhythm pattern search section 214 calculates, as a difference between the input rhythm pattern A and the rhythm pattern B, an average value between the integrated value calculated in (2) above and integrated value calculated in (4) above.

In the instant embodiment, where a sufficient number of rhythm patterns are not prepared, the rhythm pattern search section 214 performs, as shown in (3) of FIG. 10, an operation for refraining from using the absolute value of each ON-set time interval difference greater than a reference time interval (in the illustrated example, "0.125" because the rhythm category here is "eighth") in the calculation of the integrated value. In a case where a sufficient number of rhythm patterns can be prepared, on the other hand, the rhythm pattern search section 214 does not have to perform the above-mentioned operation for refraining from using the absolute value of each ON-set time interval difference greater than the reference time interval. The rhythm pattern search section 214 performs the aforementioned calculations (1) to (5) for rhythm patterns in all of the rhythm pattern records included in the rhythm pattern table.

Next, at step S7, the rhythm pattern search section 214 multiplies the similarity distance, calculated for each of the rhythm categories at step S4 above, by the difference calculated at step S6, to thereby calculate a distance, from the input rhythm pattern, for all of rhythm pattern records included in the rhythm pattern table and having part IDs of performance parts matching the designated or identified performance part. The following is a mathematical expression explanatory of the operation of step S7, where "A" indicates the input rhythm pattern and "B" indicates a rhythm pattern in an N-th rhythm pattern record. Note that the "performance parts matching the designated or identified performance part" are not limited to one or more performance parts matching one or more performance parts input as objects of search by the user, and may be one or more performance parts similar to at least one performance part input as an object of search or search object by the user.

Distance between Rhythm Pattern $A$ and Rhythm Pattern $B$=(Similarity Distance between Rhythm Pattern $A$ and Rhythm Category Rhythm Pattern $B$ belongs to)×(Difference between Rhythm Patterns $A$ and $B$)

Note that a smaller distance between the rhythm patterns A and B means that the rhythm pattern B has a higher degree of similarity to the input rhythm pattern A. Namely, the distance between the rhythm patterns A and B represents a degree of similarity between the rhythm patterns A and B. In the following description, a small distance between the rhythm patterns will sometimes be referred to as "high degree of similarity between the rhythm patterns" or something like that. Note, however, that, in the aforementioned calculation of the distance, the following operations are performed such that a searched-out result is output from within the category which the input rhythm pattern has been determined to belong to at step S5 above. Namely, the rhythm pattern search section 214 determines whether the rhythm category identified at step S5 above and the rhythm category which the rhythm pattern B belongs to are identical to each other, and, if not identical, it adds a predetermined constant (e.g., 0.5) to the distance calculated by the above-mentioned mathematical expression. By such addition of the predetermined constant (e.g., 0.5), the rhythm pattern distance would become greater or rather exaggerated for each rhythm pattern record belonging to a rhythm category that is not identical to the rhythm category identified at step S5, and thus, searched-out results can be more readily output from within the rhythm category which the input rhythm pattern has been determined to belong to at step S5.

Then, at step S8, the rhythm pattern search section 214 outputs, as searched-out results, a predetermined number of rhythm pattern records having rhythm pattern data, small in distance from the input rhythm pattern, in ascending order of the distance from the input rhythm pattern, so that the output rhythm pattern records are stored into the RAM. The "predetermined number" may be stored in advance as a parameter in the storage section 22 and may be made changeable by the user using the operation section 25. Then, the search information processing section 215 searches through the style table on the basis of the rhythm pattern IDs and part IDs of the rhythm pattern records stored in the RAM at step S8 as noted above, and stores style records, identified through the search, into the RAM as searched-out results, at step S9. For example, if a rhythm pattern record whose part ID is "2" (chord) and rhythm pattern ID is "0004" is stored into the RAM at step S8, then the search information processing section 215 searches out, from the style table, a style record whose chord rhythm pattern ID is "0004" and stores the searched-out style record into the RAM.

FIGS. 11A to 11C are diagrams showing lists of searched-out results for automatic accompaniments. More specifically, FIG. 11A shows a list of style records displayed on the display section 24 after having been output as searched-out results by the search information processing section 215 on the basis of a rhythm pattern input by the user via the chord tone inputting keyboard range 12. In FIGS. 11A to 11C, reference item "similarity" represents a distance between the input rhythm pattern and a rhythm pattern of each of the searched-out style records. Namely, a smaller value of the "similarity" represents a higher degree of similarity to the input rhythm pattern. In FIG. 11A, the style records are displayed in ascending order of values of the similarity (i.e., distance between the rhythm patterns calculated at step S7), i.e. descending order of the degree of similarity to the input rhythm pattern. In this case, the user can cause the searched-out results to be displayed after filtering the searched-out results using at least any one of the items "Key", "Genre" and "BPM". Once the user selects a desired one of the style records in the illustrated example of FIG. 11A, the information processing device 20 outputs, via the sound output section 26, tones based on the selected style record with a same BPM as when the user input the rhythm pattern (hereinafter referred to as "input BPM"). In displaying the searched-out results, it is not necessary to display all of the reference items ("similarity", "key", "genre" and "BPM") as shown in FIGS. 11A to 11C, and only some of the reference items, or none of the reference items, may be displayed. Similarly, in displaying the searched-out results after filtering the same, it is not necessary to display all of the reference items ("similarity", "key", "genre" and "BPM"), and only some of the reference items, or none of the reference items, may be displayed.

The control section 21 has a filtering function for outputting, as searched-out results, only style records each having a BPM close to the input BPM, and the user can turn on or off the filtering function as desired via the operation section 25. Because each of the style records has a "BPM", the control section 21 displays, as searched-out results, only style records each having a BPM that is, for example, 0.7-1.4 times the input BPM, when the filtering function is ON. Note that the coefficient values 0.7-1.4 applied to the input BPM are just illustrative and may be other values.

The reason why the control section 21 has such a filtering function is as follows. The control section 21 supplies a tone data set based on a style record with the same BPM as the input BPM. If the tone data set based on the style record is supplied by the control section 21 with a BPM greatly different from an original BPM of the tone data set, then tones based on the tone data set would undesirably give an uncomfortable feeling to the user when audibly output by the sound output section 26. For example, let's assume a case where the user inputs a rhythm pattern at a tempo of BPM "240" and where an original BPM represented by a tone data set acquired as a result of searching for tone data sets having the aforementioned rhythm pattern, is "60". In this case, tones based on the searched-out tone data set are audibly output by the sound output section 26 with a BPM that is four times the original BPM, namely, the tones based on the tone data set are reproduced in a fast-forwarding fashion with the BPM four times the original BPM, as a result of which an uncomfortable feeling would be given to the user. To avoid such an inconvenience, the control section 21 in the instant embodiment has the filtering function.

FIG. 11B shows a state in which the user has turned on the filtering function from the state shown in FIG. 11A. In FIG. 11B, the control section 21 is performing the filtering by use of the above-mentioned coefficients 0.7-1.4. In the illustrated example of FIG. 11B, style data sets each having a BPM in the range of 70 to 140 are displayed as filtered results because the input BPM is "100". In this way, the user can obtain, as searched-out results, style data sets each having a BPM close to the input BPM, so that the user can have a more feeling of satisfaction with the searched-out results.

Further, the user can obtain second searched-out results narrowed down from first searched-out style data, by first designating a performance part to search for style data sets each having a rhythm pattern close to an input rhythm pattern (first search) and then designating another performance part and inputting a rhythm pattern to again search for style data sets (second search). FIG. 11C shows content displayed as a result of the user designating the high-hat part as the performance part and inputting a rhythm pattern in the state where the searched-out results of FIG. 11A are being displayed. Further, in FIG. 11C, style data sets having musical time information of "4/4" input to the time filter 303 are displayed as searched-out results. The "similarity" in FIG. 11C is a value obtained by adding together a similarity in a case where the object or target performance part is "chord" and a similarity in a case where the target performance part is "high-hat". Although FIG. 11 shows that the search can be performed using two performance parts as indicated by items "first search part" and "second search part", the number of performance parts capable of being designated for the search purpose is not so limited. Further, if the user inputs, following the first search designating a first performance part (first search part), a rhythm pattern after designating a different performance part (second search part) different from the first designated performance part (first search part), the control section 21 may output only searched-out results using (designating) the second search part irrespective of searched-out results using (designating) the first search part (this type of searched-out results obtained using only the second search part will be referred to as "overwriting search"). Switching may be made between the narrowing-down search and the overwriting search by the user via the operation section 25 of the information processing device 20.

The foregoing has described the operational sequence of the processing performed by the rhythm pattern search section 214 and search information processing section 215 for outputting, as searched-out results, particular style records from the style table on the basis of a user-input rhythm pattern when the search function is ON.

The information processing device 20 constructed in the aforementioned manner can search, for a user-designated performance part, for an automatic accompaniment data set having a phrase composed of a rhythm pattern (tone generation pattern) that satisfies a predetermined condition of similarity to a user-intended rhythm pattern (tone generation pattern). At that time, the user inputs a rhythm pattern (query pattern) on or after designating a desired one of the plurality of performance parts associated with the plurality of performance controls. Thus, whenever the user comes up with a rhythm pattern (tone generation pattern) for a particular performance part, the user can perform a search by inputting the rhythm pattern (query pattern) for the particular performance part. Further, because the user only has to input the rhythm pattern (query pattern) on or after designating the performance part, the user can search for an automatic accompaniment data set intuitively and efficiently.

<Modifications>

The above-described preferred embodiment of the present invention may be modified as follows, and the following modifications may also be combined as necessary.

<Modification 1>

According to the above-described preferred embodiment, the rhythm pattern search section 214 is constructed in such a manner that, once the user inputs rhythm patterns after sequentially designating a plurality of different performance parts, it first searches for style records on the basis of the rhythm pattern for the first-designated performance part (first search) and then performs a narrowing search (second search) on the basis of the rhythm pattern for the second-designated performance part different from the first-designated performance part. However, the search scheme to be employed when a plurality of performance parts have been designated is not limited to the aforementioned. Further, whereas the above-described processing is based on the assumption that user's performance operation is executed sequentially on a part-by-part basis, the following process may be performed when the user has executed performance operation after simultaneously designating a plurality of different performance parts. Namely, in such a case, the rhythm pattern search section 214 calculates a degree of similarity, to the input rhythm pattern for each of the user-designated performance parts, of each of rhythm pattern records having the part ID of the designated performance part. Namely, for each of the designated performance parts, the rhythm pattern search section 214 calculates degrees of similarity, to the input rhythm pattern, of individual rhythm pattern records having the part ID of the designated performance part. Then, the rhythm pattern search section 214 adds together the degrees of similarity, calculated respectively for the rhythm pattern records of the designated performance parts, for each of the style records associated with the rhythm pattern records. Then, the display section 24 displays the style records in a predetermined order of the added degrees of similarity starting with the style record having the highest degree of similarity (namely, smallest value of the degree of similarity). For example, when the user has input rhythm patterns after simultaneously executing performance operation for the bass drum and snare drum parts, the rhythm pattern search section 214 calculates degrees of similarity for the bass drum and degrees of similarity for the snare drum part and then adds together the degrees of similarity, calculated for the bass and snare drum parts, for each of the style records common to the bass and snare drum parts or having at least both of the bass and snare drum parts. In this way, the user can search out an automatic accompaniment data set having a phrase composed of a rhythm pattern satisfying a condition of presenting a high degree of similarity to user-intended rhythm patterns, by simultaneously designating a plurality of performance parts.

<Modification 2>

Whereas the above-described preferred embodiment is constructed in such a manner that, in response to the user inputting a rhythm pattern after designating a desired performance part, the information processing device 20 outputs an automatic accompaniment data set as a searched-out result, the present invention is not so limited, and a search may be performed in response to the user inputting a melody pattern after designating a desired performance part. In such a case, the automatic accompaniment DB 211 further contains a melody pattern table. FIGS. 12 and 13 are schematic diagrams showing example content of the automatic accompaniment DB employed in Modification 2, of which FIG. 12 shows the melody pattern table contained in the automatic accompaniment DB. The melody pattern table comprises a plurality of items, "part ID", "musical instrument type ID", "melody pattern ID" and "melody pattern data". The "part ID" and "musical instrument type ID" are the same as those described above in relation to the preferred embodiment. The "melody pattern ID" is an identifier uniquely identifying a melody pattern record and, for example, in the form of a 4-digit number. The "melody pattern data" is a file having recorded therein a series (temporal or time-serial variation) of tone pitches and durations of individual component notes in a phrase constituting a measure; for example, it is a text file where are described series of tone pitches and durations of the component notes. FIG. 13 shows a style table employed in Modification 2. In the illustrated example of FIG. 13, each style record includes not only rhythm pattern IDs of individual performance parts but also melody pattern IDs for the individual performance parts. The information processing device 20 may search for a melody pattern by use of any one of the well-known methods. For example, when the user has input a chord sequence of "C-D-E", the control section 21 of the information processing device 20 outputs, as a searched-out result, a melody pattern record having melody pattern data representing a tone pitch progression in the input chord sequence by relative numerical values of "0-2-4". Then, the control section 21 displays, on the display section 24, a style record associated with the searched-out melody pattern record.

For example, when the user has input a single-note-based melody pattern of "D-D-E-G" designating the phrase part, the control section 21 generates MIDI information indicative of the input melody pattern. The MIDI information includes tone pitches and durations of individual component notes constituting the melody pattern. The control section 21 outputs, as a searched-out result, a melody pattern record having melody pattern data identical to or similar to the generated MIDI information. Then, the control section 21 displays, on the display section 24, a style record associated with the searched-out melody pattern record. Switching between the melody-pattern-based search as employed in this modification and the rhythm-pattern-based search as employed in the above-described preferred embodiment may be made by the user via the operation section 25 of the information processing device 20. As another modification, the query pattern input by the user may be one specifying tone pitches and generation order of individual component notes constituting a melody pattern, i.e. one specifying only a rough melody progression without specifying in detail durations of individual notes of the melody pattern.

<Modification 3>

The information processing device 20 may search for an automatic accompaniment data set including a phrase having a tone color identical to, or having a high degree of similarity to, a tone color of an input rhythm pattern. In such a case, another item "tone color ID" is added to each of the rhythm pattern records of the rhythm pattern table. When inputting a rhythm pattern via any one of the performance controls, the user designates a tone color. Once the user executes performance operation, the ID of the tone color designated at the time of the performance operation is input to the information processing device 20. Then, the information processing device 20 compares the tone color of the input tone color ID and the tone color of the tone color ID in each of the rhythm pattern records of the rhythm pattern table and thereby identifies, from among compared results, a rhythm pattern record having a degree of similarity higher than a predetermined threshold value. The tone color comparison here may be performed in any one of the well-known methods, e.g. by comparing spectra of waveforms of individual tones. Then, the information processing device 20 searches through the style table on the basis of the rhythm pattern ID and part ID of the identified rhythm pattern record to thereby identify a style record. In this way, the user can obtain an automatic accompaniment data set similar to the user input not only in rhythm pattern but also in tone color for the designated performance part.

<Modification 4>

Whereas the preferred embodiment has been described above in relation to the case where tone data are described as MIDI information in the automatic accompaniment DB, storage locations of audio files containing data of tones themselves may be described in the automatic accompaniment DB. In this case, the audio files are each in a sound file format, such as the WAVE (RIFF Waveform Audio Format) or mp3 (MPEG Audio Layer-3), and a file path of such an audio file is described in each of the rhythm pattern records of the rhythm pattern table. Once the user selects, from among searched-out results, a given style record as an object of reproduction, audio files of individual performance parts in the style record are reproduced in a mutually synchronized fashion. In this way, the user can obtain an automatic accompaniment of better sound quality than in the case where MIDI information is used.

<Modification 5>

The information processing device 20 may be equipped with a random access reproduction function for reproducing automatic accompaniment data from the beginning of a measure in response to the user operating the operation section 25 or operating a control, such as a fader, knob, wheel, button or the like provided on the rhythm input device 10. In this case, once the user performs the aforementioned operation, the reproduction control section 216 performs control for reproducing the automatic accompaniment data from the beginning of the measure. This random access reproduction function is used when the user wants to check where is the beginning of automatic accompaniment tones or wants to sets only a portion of automatic accompaniment tones as an object of repetitive reproduction.

<Modification 6>

In some of the automatic accompaniment sets, the waveform amplitude (power) does not end in near a value "0" in the neighborhood of a component note, in which case clip noise may occur after a tone based on the component note has been audibly generated. To avoid such an inconvenience, the reproduction control section 216 may have a function of automatically fading in or out a predetermined range near the beginning or end of the component note. Here, the user can select, via the operation section 25 or some control provided on the rhythm input device 10, whether or not to apply the fading-in or fading-out function.

Figures 14, 18:
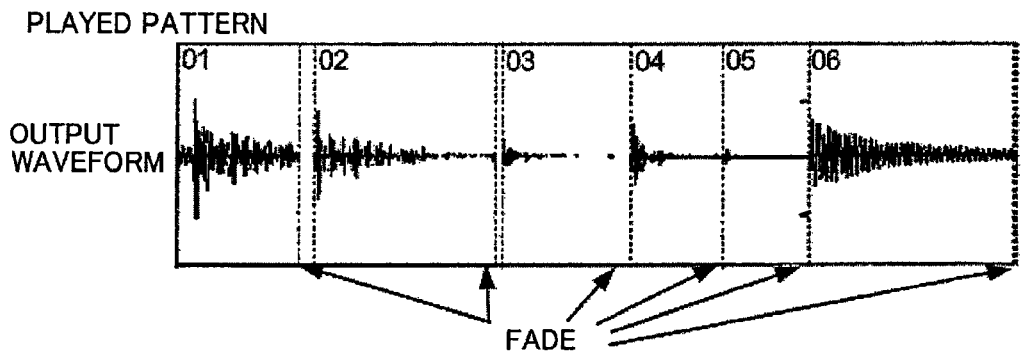
FIG. 14 is a schematic diagram showing an example where fading-out is applied to individual component notes of an automatic accompaniment data set in modification 6.
FIG. 18 is a diagram showing an example of an ON-set time table.

FIG. 14 is a schematic diagram showing an example where the fading-out is applied to individual component notes of an automatic accompaniment data set. As shown in FIG. 14, the fading-out is applied to portions depicted by arrows labeled "Fade", so that a waveform in each of the arrowed portions gradually decreases in amplitude to take a substantially zero amplitude at the end time of the corresponding component note. A time period over which the fading-out is applied is adjustable within a range of several msec to dozens of msec as desired by the user. An operation for applying the fading-out may be performed as pre-processing of user's performance operation, as real-time processing, or as post-processing of the user's performance operation.

<Modification 7>

A performance executed by the user along with an automatic accompaniment may be recorded by the reproduction control section 216, and the thus-recorded content may be output in a file format conventionally used in a sound source loop material. With such a performance recording function, the user can acquire, as data, a result of a performance executed by the user along with an automatic accompaniment.

<Modification 8>

Whereas the preferred embodiment has been described in relation to the case where the rhythm pattern search section 214 detects a particular rhythm pattern record through comparison between trigger data input through user's performance operation and rhythm pattern data stored in the automatic accompaniment DB 221, the present invention is not so limited. For example, the rhythm pattern search section 214 may search through the automatic accompaniment DB 221 on the basis of both trigger data and velocity data input through user's performance operation. In this case, if two rhythm pattern data having a same rhythm pattern exist, a style record associated with one of the rhythm pattern data, in which attack intensity of each component note is closer to the velocity data input through the user's performance operation than the other, is detected as a searched-out result. In this manner, for the attack intensity too, an automatic accompaniment data set close to a user's image can be output as a searched-out result.

<Modification 9>

The manner in which a distance between rhythm patterns is calculated in the above-described preferred embodiment is merely illustrative, and such a distance may be calculated in a different manner from the aforementioned. For example, the rhythm pattern difference calculation at step S6 and the rhythm pattern distance calculation at step S7 may be performed after a rhythm category which the input rhythm pattern belongs to is identified and using, as objects of calculation, only rhythm pattern records belonging to the identified rhythm category, so that a rhythm pattern record matching the rhythm category of the input rhythm pattern can be reliably output as a searched-out result. Because such a modified arrangement can reduce the quantities of necessary calculations although it can achieve only a lower search accuracy than the preferred embodiment, this modification can not only achieve a lowered load on the information processing device 20 but also achieve reduced response times for the user.

<Modification 10>

Further, when searching through the automatic accompaniment DB 221, the rhythm pattern search section 214 may use, in addition to trigger data and velocity data, duration data indicative of a time length for which audible generation of a same note continues or lasts. The duration data of each component note is represented by a time length calculated by subtracting, from an OFF-set time, an ON-set time immediately preceding the OFF-set time of the component note. Particularly, in a case where the input means of the rhythm input device 10 is the keyboard, the duration data can be used very effectively because the duration data allows the information processing device 20 to clearly acquire the OFF-set time of the component note. In this case, an item "Duration Pattern Data" is added to the rhythm pattern table of FIG. 5. The duration pattern data is a data file, such as a text file, having recorded therein durations (audible generation time lengths) of individual component notes in a phrase constituting one measure. In this case, the information processing device 20 may be constructed to search through the rhythm pattern table by use of a user-input duration pattern of one measure and output, as a searched-out result from the rhythm pattern table, a rhythm pattern record having duration pattern data most similar (or closest) to the user-input duration pattern. Thus, even where a plurality of rhythm pattern records having similar rhythm patterns exist, the information processing device 20 can distinguish or identify a rhythm pattern having a slur, rhythm pattern staccato (bounce feeling), or the like, from among the similar rhythm patterns and output the identified rhythm pattern as a searched-out result.

<Modification 11>

The following parameters may further be used when the part identification section 213 is going to identify a performance part on the basis of MIDI information received. FIGS. 15A and 15B are diagrams showing example content of the part table employed in modification 11. In the illustrated example, note numbers greater than "45" are allocated to the "bass drum" part as well as to the "chord" and "phrase" parts, and an additional item "duration" is added to the part table. As also shown, once the user depresses or operates a plurality of keys of in the keyboard range of note numbers greater than "45" in a predetermined time period (e.g., 100 msec) within a measure, the part identification section 213 identifies the user-designated performance part to be the "chord" part if the duration is long, but identifies the user-designated performance part to be the "bass drum" part if the duration is short. Here, whether the duration is "long" or "short" may be determined by the part identification section 213 on the basis of a predetermined threshold value.

The illustrated example of FIG. 15A is based on an assumption that user's performance operation on a plurality of keys is executed within a predetermined time period (e.g., 100 msec), because, when the user has operated a plurality of keys like this, a different performance part is allocated depending on whether the duration is long or short. However, in a case where a different performance part is allocated depending on whether the duration is long or short when the user has operated a single key, the user's operation on the single key need not be executed within the predetermined time period (e.g., 100 msec); such user's operation on the single key only has to be executed within one measure. Further, when the user wants to make input for the performance part corresponding to the "long" duration, then a rhythm pattern input by the user may undesirably become longer than intended, because, due to the setting of the threshold value, the user has to input the rhythm pattern with duration longer than intended. In order to avoid such an inconvenience to thereby allow the user to have a natural feeling when executing performance operation, it is only necessary for a human operator to empirically obtain in advance a suitable threshold value for determining whether the duration is "long" or "short". Alternatively, if the user has input a rhythm pattern with an extremely long duration beyond the threshold value, the following process may be performed. For example, if the performance part is "chord", the control section 21 searches chord-part rhythm patterns for one which comprises sustained notes and which is close to the input rhythm pattern. If the performance part is "phrase", the control section 21 searches phrase-part rhythm patterns for one which comprises a phrase of single sustained notes continuously varying in tone pitch like a phrase produced by a synthesizer or the like and which is close to the input rhythm pattern. Further, if the performance part is "snare drum", the control section 21 searches snare-drum-part rhythm patterns for a drum-roll rhythm pattern. In this way, even when the user has input a rhythm pattern with an extremely long duration beyond the threshold value, this modification can appropriately search for a corresponding rhythm pattern, and thus, increased variations of the tone search method or scheme can be provided to the user.

In this case, a pitch-bend wheel may be used in combination with the keyboard, as a control for inputting a query pattern on the rhythm input device 10. For example, a pitch-bending phrase pattern (melody pattern) may be input as a searching query pattern by the user varying a tone pitch via the pitch-bend wheel while continuing depression of a given key of the keyboard. As another alternative, a searching query pattern may be input by the user graphically drawing a discrete pattern or a continuous pattern with X and Y axes of an X-Y pad used as a time axis and a pitch axis, respectively.

Further, in the illustrated example of FIG. 15B, note numbers greater than "45" are allocated to the "snare drum" part as well as to the "chord" and "phrase" parts, and an additional item "velocity" is added to the part table. In this case, once the user depresses or operates a single key in the keyboard range of note numbers greater than "45" within a measure, the part identification section 213 identifies the user-designated performance part to be the phrase part if the velocity is weak, but identifies the user-designated performance part to be the "snare drum" part if the velocity is strong. Here, whether the velocity is "strong" or "weak" may be determined by the part identification section 213 on the basis of a predetermined threshold value, as in the case of the duration. Also note that the above-mentioned threshold values may be prestored in the storage section 22 and may be made changeable by the user via the operation section 25. Further, the control as to which of the performance parts should be allocated depending on the contents of the duration and velocity may be made changeable by the user via the operation section 25, without being limited to the aforementioned. Thus, in this modification, the user can designate any one of various different performance parts depending on a difference in the operation style, i.e. using a corresponding one of various different operation styles, such as duration or intensity of performance operation, without being limited to the operation style regarding whether the number of control operated within a predetermined time period is singular or plural. Alternatively, the user's operation style may be determined on the basis of any one of, or a combination of a plurality of different operation styles.

<Modification 12>

Whereas the preferred embodiment has been described as determining that a sound generation time interval histogram has a high value of similarity to an input time interval histogram when an absolute value of a difference between the input time interval histogram and the sound generation time interval histogram is the smallest, the condition for determining a high degree of similarity between the two histograms is not necessarily limited to the absolute value of the difference between the two histograms and may be any other suitable condition, such as a condition that a degree of correlation between the two histograms, such as a product of individual time interval components of the two histograms, is the greatest or greater than a predetermined threshold value, a condition that the square of the difference between the two histograms is the smallest or smaller than a predetermined threshold value, or a condition that the individual time interval components are similar in value between the two histograms, or the like.

<Modification 13>

Whereas the preferred embodiment has been described above in relation to the case where the information processing device 20 searches for a rhythm pattern record having a rhythm pattern similar to a rhythm pattern input via the rhythm input device 10 and outputs, as a searched-out result, a style record associated with the searched-out rhythm pattern record, the following modified arrangement may be employed. For example, in a case where the processing performed by the preferred embodiment is performed by a Web service, the functions possessed by the information processing device 20 in the preferred embodiment are possessed by a server apparatus providing the Web service, and a user's terminal, such as a PC, that is a client apparatus, transmits a rhythm pattern, input for a designated performance part, to the server apparatus via the Internet, dedicated line, etc. On the basis of the performance part and input rhythm pattern received from the client apparatus, the server apparatus searches through the storage section for a rhythm pattern record having a rhythm pattern similar to the input rhythm pattern and then transmits, as a searched-out result, a style record associated with the rhythm pattern record to the user's terminal. Then, the terminal audibly outputs tones based on the received style record. Note that, in this case, the bar line clock signals may be presented to the user in the Web site or application provided by the server apparatus.

<Modification 14>

The performance controls in the rhythm input device 10 may be of other than the keyboard and pad types (shapes), such as a string instrument type, wind instrument type or button type, as long as the performance controls output at least trigger data in response to performance operation executed by the user. Alternatively, the performance controls may be in the form of a touch panel, in which case a tablet PC, smart phone, portable or mobile phone or the like having the touch panel functions as an input means in place of the rhythm input device 10.

Let's now consider a case where the performance controls are in the form of a touch panel. In some cases, a plurality of icons are displayed on a screen of the touch panel. If images of musical instruments and controls (e.g., keyboard) of musical instruments are displayed in the icons, the user can know which of the icons should be touched to audibly generate a tone based on a particular musical instrument or particular control of a musical instrument. In this case, regions of the touch panel where the icons are displayed correspond to the individual performance controls provided in the above-described preferred embodiment. Stated differently, in the case where a touch panel is employed as the input device 10, a display screen of the touch panel may be segmented or divided into a plurality of regions so that a search-object performance part can be identified in accordance with a user's operation style applied to any one of the divided regions.

Alternatively, a pitch-bend wheel may be employed as a performance control of the rhythm input device 10. As another example, the rhythm input device (query pattern input device) 10 may be other than the one comprising manually-operable performance controls, such as a sound input device using a microphone or an optical signal generation device. In such a case, an input rhythm pattern (query pattern) corresponding to times (time points) of user's voice utterance or an input rhythm pattern (query pattern) corresponding to times (time points) of optical signal generation by user's operation is generated. Further, the rhythm input device (query pattern input device) 10 may be of other than the type which inputs a rhythm pattern (query pattern) in time with tempo information given by a metronome or the like, such as a type which graphically inputs a desired rhythm pattern (query pattern) on an editor screen (e.g., graphically indicates desired timing on the time axis displayed on the screen or graphically inputs a desired pattern).

<Modification 15>

The above-described preferred embodiment is constructed in such a manner that tone data based on a style record are supplied by the control section 21 with a same BPM as an input BPM. Alternatively, because a style record includes an original BPM previously recorded as information, the user may operate the operation section 25 to cause tone data, based on a style record, to be supplied by the control section 21 with the original BPM. As another alternative, the control section 21 may supply tone data, based on a style record, with a same BPM as an input BPM immediately after the user selects a particular style record from among searched-out results, and then with a BPM that gradually approaches the original BPM of the style record as the time passes.

<Modification 16>

In the above-described preferred embodiment, the control section 21 has the filtering function for outputting, as a searched-out result, a style record having a BPM close to a user-input BPM. However, the scheme for allowing the user to have a more feeling of satisfaction with a searched-out result is not limited to this. For example, weighting based on closeness between the input BPM and the original BPM included in the style record may be introduced into the mathematical expression for calculating a distance between an input rhythm pattern and a rhythm pattern record contained in the rhythm pattern table. Assuming that "a" represents a predetermined constant and "L" represents a distance between the input rhythm pattern and the rhythm pattern record contained in the rhythm pattern table, a mathematical expression for calculating a similarity (as described in relation to FIG. 11) with the weighing introduced therein can be expressed as follows:

similarity=$L$+|input BPM−BPM included in the style record|/$a$

Note, however, that the mathematical expression for calculating such a similarity is not limited to the mathematical expression above and any other mathematical expression may be employed as long as the similarity decreases (i.e., the degree of similarity increases) as the input BPM and the BPM included in the style record become closer to each other.

<Modification 17>

If the rhythm input device 10 includes no input pad 14, the rhythm input device 10 may be constructed as follows. Here, by default, the bass tone inputting keyboard range 11 and melody tone inputting keyboard range 12 are allocated to respective predetermined key ranges of the keyboard 200. Once the user indicates that the user is about to input a rhythm pattern for drums parts, the control section 21 allocates the drums parts to predetermined key ranges of the keyboard 200; for example, the control section 21 allocates the bass drum part to "C3", the snare drum part to "D3", the high-hat part to "E3", and the cymbal part to "F3". Note that, in this case, the control section 21 can allocate a different musical instrument tone to each of the controls (i.e., keys) located in the entire key range of the keyboard 200. Further, the control section 21 may display an image of the allocated musical instrument tone (e.g., image of the snare drum) above or below each of the controls (keys) of the keyboard 200.

<Modification 18>

Whereas the processing flow of FIG. 8 has been described above in relation to the case where a distribution of ON-set time intervals in an input rhythm pattern is calculated (step S3) after a distribution of ON-set time intervals is calculated for each of the rhythm categories (step S1), the processing order of steps S1 and S3 may be reversed. Further, irrespective of the reversal of the processing order of steps S1 and S3, the control section 21 may store the distribution of ON-set time intervals, calculated for each of the rhythm categories, into the RAM or storage section 22 after the calculation. In this way, there is no need for the rhythm pattern search section 214 to re-calculate the once-calculated results, which can thereby achieve an increased processing speed.

<Modification 19>

When the user inputs a rhythm pattern by operating a plurality of controls within a predetermined time period, e.g. when the user depresses keys of the keyboard to input a chord, there would arise the following problem. Let it be assumed here that the user has input a rhythm at a time point of "0.25" within a measure. In this case, even when the user attempts to operate a plurality of controls simultaneously at a same time point, the user may actually operate only a certain one of the controls at an ON-set time of "0.25" and another of the controls at an ON-set time of "0.26", in which case the control section 21 would store the input rhythm pattern exactly at these ON-set times. Consequently, a searched-out result different from the user's intention may be undesirably output; thus, good operability cannot be provided to the user. To address the problem, the following arrangements may be employed.

In this modification 19, the part identification section 213 determines, on the basis of ON-set information input from the rhythm input device 10 and the part table contained in the automatic accompaniment DB 211, whether or not user's operation has been performed on a plurality of controls at a same time point for a same performance part. For example, if a difference between an ON-set time of one of the controls included in the bass tone inputting keyboard range 11 and an ON-set time of another of the controls included in the bass tone inputting keyboard range 11 falls within a predetermined time period, then the part identification section 213 determines that these controls have been operated at the same time point. Here, the predetermined time period is, for example, 50 msec (millisecond). Then, the part identification section 213 outputs a result of the determination, i.e. information indicating that the plurality of controls can be regarded as having been operated at the same time point, to the rhythm pattern search section 214 in association with trigger data having the corresponding ON-set times. Then, the rhythm pattern search section 214 performs a rhythm pattern search using the input rhythm pattern after excluding, from the input rhythm pattern, one of the trigger data (with which has been associated the information indicating that the plurality of controls can be regarded as having been operated at the same time point) that has the ON-set time indicative of a later sound generation start time than the ON-set time of the other trigger data. Namely, in this case, of the ON-set times based on the user's operation performed within the predetermined time period, the ON-set time indicative of an earlier sound generation start time will be used in the rhythm pattern search. Alternatively, however, of the ON-set times based on the user's operation performed within the predetermined time period, the ON-set time indicative of a later sound generation start time may be used in the rhythm pattern search. Namely, the rhythm pattern search section 214 may perform the rhythm pattern search using any one of the ON-set times based on the user's operation performed within the predetermined time period. As another alternative, the rhythm pattern search section 214 may calculate an average value of the ON-set times based on the user's operation performed within the predetermined time period and then perform the rhythm pattern search using the thus-calculated average value as an ON-set time in the user's operation performed within the predetermined time period. In the aforementioned manner, even when the user has input a rhythm using a plurality of controls within a predetermined time period, a searched-out result close to a user's intention can be output.

<Modification 20>

The following problem can arise if the timing for the input rhythm pattern storage section 212 to store an input rhythm pattern on a per-measure basis is set to coincide with measure switching timing based on the bar line clock signal. For example, when a rhythm pattern is input through user's operation, errors in a range of several msec to dozens of msec may occur between a rhythm pattern intended by the user and actual ON-set times due to differences between time intervals being felt by the user and the bar line clock signal. Therefore, even when the user thinks it is inputting a beat at the head of a measure, that beat may be erroneously treated as a rhythm input of a preceding measure due to the above-mentioned error. In such a case, a searched-out result different from user's intention would be undesirably output; thus, good operability cannot be provided to the user. To address such a problem, it is sufficient to set, as a target processing range, a range from a time point dozens of msec earlier than the head of the current measure (namely, last dozens of msec in the preceding measure) to a time point dozens of msec earlier than the end of the current measure, when the input rhythm pattern storage section 212 stores the input rhythm pattern into the RAM. Namely, the control section 21 shifts a target range of the input rhythm pattern, which is to be stored into the RAM, forward by dozens of msec. In this way, this modification can minimize a possibility of a searched-out result different from user's intention from being output.

<Modification 21>

The following problem can arise if the timing for the rhythm pattern search section 214 to perform a rhythm pattern search is set to coincide with the measure switching timing based on the bar line clock signal. For example, the search method of the present invention is also applicable to a tone data processing apparatus provided with a playback function that allows a searched-out tone data set to be played back or reproduced in synchronism with the bar line clock signal in a measure immediately following rhythm input. In this case, in order for the searched-out tone data set (searched-out result) to be reproduced from the head of a measure immediately following the rhythm input operation, the searched-out result has to be output before the time point of the head of the measure, i.e. within the same measure where the rhythm input has been made. Further, in a case where a tone data set to be reproduced cannot be read out and stored into the RAM in advance due to a storage capacity problem of the RAM or the like, there is a need to read out a searched-out tone data set and store the read-out tone data set into the RAM within the same measure where the rhythm input has been made. To address such a problem, it is sufficient to shift the timing for the rhythm pattern search section 214 to perform a rhythm pattern search to be dozens of msec earlier than the measure switching timing. In this way, the search is performed and a searched-out tone data set is stored into the RAM before the measure switching is effected, so that the searched-out tone data set can be reproduced from the head of the measure immediately following the rhythm input.

<Modification 22>

The following arrangements may be made for permitting a search for a rhythm pattern of a plurality of measures (hereinafter referred to as "N" measures) rather than a rhythm pattern of one measure. For example, in this case, a method may be employed in which the rhythm pattern search section 214 searches through the rhythm pattern table by use of an input rhythm pattern having the N measures. However, with this method, the user has to designate where the first measure is located, at the time of inputting a rhythm pattern in accordance with the bar line clock signals. Also, because a searched-out result is output following the N measures, it would take a long time before the searched-out result is output. To address such an inconvenience, the following arrangements may be made.

In this modification 22, the rhythm pattern table of the automatic accompaniment DB 221 contains rhythm pattern records each having rhythm pattern data of N measures. The user designates, via the operation section 25, the number of measures in a rhythm pattern that is to be made a search object (i.e., a search-object rhythm pattern). Content of such user's designation is displayed on the display section 24. Let's assume here that the user has designated "two" as the number of measures in a search-object rhythm pattern. Once the user inputs a rhythm by use of any of the controls, the control section 21 first stores an input rhythm pattern of the first measure and then searches for a rhythm pattern on the basis of the input rhythm pattern of the first measure. The search is performed in accordance with the following operational sequence. First, regarding the rhythm pattern records each having rhythm pattern data of two measures, the rhythm pattern search section 214 calculates distances between the input rhythm pattern of the first measure and rhythm patterns of the first measure and second measure of each of the rhythm pattern data. Then, for each of the rhythm pattern data, the rhythm pattern search section 214 stores, into the RAM, the smaller of the calculated distance between the input rhythm pattern of the first measure and the rhythm pattern of the first measure of the rhythm pattern data and the calculated distance between the input rhythm pattern of the first measure and the rhythm pattern of the second measure of the rhythm pattern data. Then, the control section 21 performs similar operations for an input rhythm pattern of the second measure. After that, the rhythm pattern search section 214 adds together the distances, thus stored in the RAM, for each of the rhythm pattern data, and then sets the sum (added result) as a score indicative of a distance of the rhythm pattern data from the input rhythm pattern. Then, the search information processing section 215 rearranges, in descending order of the above-mentioned score, individual rhythm pattern data of which the above-mentioned score is less than a predetermined threshold value, and then outputs such rhythm pattern data as searched-out results. In the aforementioned manner, it is possible to search for rhythm pattern data having a plurality of measures. Because a distance between the input rhythm pattern and the rhythm pattern data is calculated for each of the measures, there is no need for the user to designate where the first measure is located, and no long time is taken before the searched-out results are output.

<Modification 23>

Whereas modification 2 has been described above as performing a search on the basis of a melody pattern input by the user after designating a performance part, the present invention is not so limited. For example, of searched-out results obtained through a search performed in response to a rhythm pattern input by the user after designating a performance part, a style record more similar in melody pattern to the user's input may be output as a searched-out result. As in modification 2, each of the style records in the style table employed in modification 23 includes, in addition to a rhythm pattern ID of each performance part, a melody pattern ID of each performance part as shown in FIG. 13. Further, in this modification, the ON-set information includes a note number of the keyboard in addition to trigger data, similarly to the aforementioned. Here, a series of the ON-set times in the trigger data corresponds to an input rhythm pattern, and a series of the note numbers of the keyboard corresponds to an input melody pattern.

In modification 23, the following processes are added to the above-described search processing of FIG. 8 performed by the rhythm pattern search section 214 and search information processing section 215. Let it be assumed here that the user has operated the bass tone inputting keyboard range 11 to input a melody pattern of "C-E-G-E" in a fourth(-note) rhythm. The input melody pattern is represented, for example, by a series of note numbers "60, 64, 67, 64". Because the performance part here is "bass", the rhythm pattern search section 214 identifies, as objects of comparison, melody pattern records which are contained in the melody pattern table and whose part ID is "01 (bass)" and calculates a difference, from the input melody pattern, melody pattern data included in each of these melody pattern records identified as the objects of comparison.

The rhythm pattern search section 214 calculates a tone pitch difference variance between the input melody pattern and a melody pattern represented by melody pattern data included in each of the melody pattern records whose part ID is "01 (bass)"; the latter melody pattern will hereinafter be referred to as "sound-source melody pattern". This is based on the thought that the less variation there is in tone pitch difference between the two, i.e. the input melody pattern and the sound-source melody pattern, the more similar two melody patterns can be regarded. Assume here that the input melody pattern is represented by "60, 64, 67, 64" as note above and a given sound-source melody pattern is represented by "57, 60, 64, 60". In this case, a tone pitch difference variance between the input melody pattern and the sound-source melody pattern can be calculated in accordance with mathematical expression (2) by calculating an average value of tone pitch differences in accordance mathematical expression (1) below.

$$((|60-57|)+(|64-60|)+(|67-64|)+(|64-60|))/4=3.5 \quad \text{Mathematical Expression (1)}$$

$$((|3.5-3|)^2+(|3.5-4|)^2+(|3.5-3|)^2+(|3.5-4|)^2)/4=0.25 \quad \text{mathematical expression (2)}$$

As shown in the mathematical expressions above, a tone pitch difference variance between the input melody pattern represented by "60, 64, 67, 64" and the sound-source melody pattern represented by "57, 60, 64, 60" is calculated as "0.25". The rhythm pattern search section 214 calculates such a tone pitch difference variance for all of the sound-source melody patterns.

Next, at step S7, the rhythm pattern search section 214 obtains a degree of similarity between the input rhythm pattern and the searched-out rhythm pattern with their respective melody patterns taken into account. If a degree of similarity between the input rhythm pattern and the searched-out rhythm pattern without their respective melody patterns taken into account is defined as "S" and the tone pitch difference variance is defined as "V", then a degree of similarity Sp between the input rhythm pattern and the searched-out rhythm pattern with their respective tone pitch patterns taken into account can be expressed by the following mathematical expression (3) using a variable x and a constant y, where $0<x<1$ and $y>0$:

$$Sp=(1-x)S+xyV \qquad \text{mathematical expression (3)}$$

If the variable x is "0", the above mathematical expression becomes "Sp=S", the calculated degree of similarity will not reflect the melody patterns. As the variable x approaches a value "1", the degree of similarity obtained by the above mathematical expression reflects more of the melody patterns. The variable x may be made changeable in value by the user via the operation section 25. Further, in mathematical expression (3), an average error of tone pitch differences may be used in place of the tone pitch difference variance. Then, the search information processing section 215 rearranges the searched-out style records in the descending order of the degrees of similarity (i.e., ascending order of the distances) between the searched-out rhythm patterns and the input rhythm pattern calculated with the melody patterns taken into account, and then stores the rearranged searched-out style records.

Further, the ON-set times and the number of ON-sets in the input melody pattern and the ON-set times and the number of ON-sets of individual notes constituting a sound-source melody pattern do not necessarily coincide with each other. In such a case, the rhythm pattern search section 214 determines, for each of the ON-sets of the input melody pattern, which of the notes of the sound-source melody pattern corresponds to that ON-set of the input melody pattern, in accordance with the following operational step sequence.

(1) Using each of the ON-set times of individual notes of the input melody pattern as a calculation base, the rhythm search section 214 calculates a tone pitch difference between the note of the ON-set time of the input melody pattern and a note of an ON-set time of the sound-source melody pattern closest to the ON-set time of the input melody pattern.

(2) Using each of the ON-set times of individual notes of the sound-source melody pattern as a calculation base, the rhythm search section 214 calculates a tone pitch difference between the note of the ON-set time of the sound-source melody pattern and a note of an ON-set time of the input melody pattern closest to the ON-set time of the sound-source melody pattern.

(3) Then, the rhythm search section 214 calculates, as a tone pitch difference between the input melody pattern and the sound-source melody pitch pattern, an average value between the differences calculated at step (1) above and the differences calculated at step (2) above.

Note that, in order to reduce the quantity of necessary calculations, the tone pitch difference between the input melody pattern and the sound-source melody pattern may be calculated using only any one of steps (1) and (2) above.

In the aforementioned manner, style records not only close to a user-intended rhythm pattern but also close to a user-intended melody pattern can be output as searched-out results. Thus, the user can obtain, as a searched-out result, a style record that is identical in rhythm pattern to an input rhythm pattern but different in melody pattern from the input rhythm pattern.

==Manner of calculation of a distance between an input rhythm pattern and a rhythm category==

The aforementioned methods for calculating an input rhythm pattern and a rhythm category are merely illustrative, and such a distance may be calculated in any other different manners, or using any other different methods, as explained below.

—Number of Input Time Intervals Unique to a Category—
<Modification 24>

In modification 24, the control section 21 calculates a distance between an input rhythm pattern and each of rhythm patterns on the basis of the number of ON-set time intervals symbolic of, or unique to, the rhythm pattern, which is to be compared against the input rhythm pattern, included in the input rhythm pattern. FIG. 16 is a diagram showing an example of an ON-set time interval table that is prestored in the storage section 22. The ON-set time interval table comprises combinations of names indicative of classifications of the rhythm categories and target ON-set time intervals of the individual rhythm categories. Note that content of the ON-set time interval table is predetermined with the ON-set time intervals normalized with one measure divided into 48 equal time segments.

Let it be assumed here that the control section 21 has calculated ON-set time intervals from ON-set times of the input rhythm pattern and then calculated a group of values indicated in (a) below as a result of performing a quantization process on the calculated ON-set time intervals.

(a) 12, 6, 6, 6, 6, 6

In accordance with the calculated group of values and the ON-set time interval table shown in FIG. 16, the control section 21 identifies that there are one fourth(-note) ON-set time interval and five eighth(-note) ON-set time intervals in the input rhythm pattern. Then, the control section 21 calculates a distance between the input rhythm pattern and each of the rhythm categories as follows:

distance between the input rhythm pattern and a rhythm category $N$=1−(the number of relevant ON-set time intervals, in the input rhythm pattern, of the rhythm category $N$)/(the total number of ON-set time intervals in the input rhythm pattern)  mathematical expression (4)

Note that the above mathematical expression is merely illustrative, and that any other mathematical expression may be employed as long as it causes the distance of the rhythm category from the input pattern to be calculated into a smaller value as the rhythm category contains more relevant ON-set time intervals. Also, using mathematical expression (4) above, the control section 21 calculates, for example, a distance between the input rhythm pattern and eighth(-note) rhythm pattern as "0.166", or a distance between the input rhythm pattern and quadruple(-note) rhythm pattern as "0.833". In the aforementioned manner, the control section 21 calculates a distance between the input rhythm pattern and each of the rhythm categories, and determines that the input rhythm pattern belong to a particular rhythm category for which the calculated distance is the smallest among the rhythm categories.

—Matrix Between DB Rhythm Categories and Input Rhythm Categories—
<Modification 25>

The methods for calculating a distance between the input rhythm pattern and a rhythm category are not limited to the aforementioned and may be modified as follows. Namely, in modification 25, a distance reference table is prestored in the storage section 22. FIG. 17 is a diagram showing an example of the distance reference table where distances between rhythm categories which input patterns can belong to and categories which individual rhythm pattern records stored in the automatic accompaniment database 221 can belong to are indicated in a matrix configuration. Let it be assumed here that the control section 21 has determined that the rhythm category which an input pattern belong to is the eighth (i.e., eighth-note) rhythm category. In this case, the control section 21 identifies, on the basis of the rhythm category which the input pattern has been determined to belong to and the distance reference table, distances between the input rhythm pattern and the individual rhythm categories. For example, in this case, the control section 21 identifies a distance between the input rhythm pattern and the fourth (fourth-note) rhythm category as "0.8" and identifies a distance between the input rhythm pattern and the eighth rhythm category as "0". Thus, the control section 21 determines that the eighth rhythm category is smallest in distance from the input rhythm pattern.

—Based on an Input Time Unique to a Category and a Score—

<Modification 26>

The methods for calculating a distance between an input rhythm pattern and a rhythm category are not limited to the above-described and may be modified as follows. Namely, in modification 26, the control section 21 calculates a distance between an input rhythm pattern and each of the rhythm categories on the basis of the number of ON-set times, in the input rhythm pattern, symbolic of, or unique to, a rhythm category to be compared against the input rhythm pattern. FIG. 18 is a diagram showing an example of an ON-set time table that is prestored in the storage section 22. The ON-set time table comprises combinations of names indicative of classifications of rhythm categories, subject or target ON-set times in the individual rhythm categories, and scores to be added in a case where input rhythm patterns include the target ON-set times. Note that the content of the ON-set time table is predetermined normalized with one measure segmented into 48 equal segments.

Let it be assumed here that the control section 21 has obtained ON-set times as indicated at (b) below.

(b) 0, 12, 18, 24, 30, 36, 42

In this case, the control section 21 calculates a score of an input rhythm pattern relative to each of the rhythm categories. Here, the control section 21 calculates "8" as a score of the input rhythm pattern relative to the fourth rhythm category, "10" as a score of the input rhythm pattern relative to the eighth rhythm category, "4" as a score of the input rhythm pattern relative to the eighth triplet rhythm category, and "7" as a score of the input rhythm pattern relative to the sixteenth rhythm category. Then, the control section 21 determines, as a rhythm category having the smallest distance from the input rhythm pattern, the rhythm category for which the calculated score is the greatest.

The foregoing has been a description about variations of the methods for calculating a distance between an input rhythm pattern and each of the rhythm categories.

<Modification 27>

The present invention may be practiced as other than the tone data processing apparatus, such as a method for realizing such tone data processing, or a program for causing a computer to implement the functions shown in FIG. 4. Such a program may be provided to a user stored in a storage medium, such as an optical disk, or downloaded and installed into a user's computer via the Internet or the like.

<Other Modifications>

Whereas the preferred embodiment has been described in relation to the case where the rhythm pattern difference calculation at step S6 uses two time differences, i.e. time difference of the rhythm pattern A based on the rhythm pattern B and time difference of the rhythm pattern B based on the rhythm pattern A, (so-called "symmetric distance scheme or method"), the present invention is not so limited, and only either one of the aforementioned two time differences may be used in the rhythm pattern difference calculation.

Further, in a case where the above-described search or audible reproduction is performed using MIDI data and where performance data sets of a plurality of performance parts are reproduced in a multi-track fashion, the search may be performed only on a particular one of the tracks.

Furthermore, the rhythm category determination or identification operations (steps S2 to S5) may be dispensed with, in which case the rhythm pattern distance calculation operation of step S7 may be performed using only the result of the rhythm pattern difference calculation of step S6.

Furthermore, in the rhythm pattern difference calculation (step S6), the value of the calculated difference may be multiplied by a value of attack intensity of a corresponding component note so that a rhythm pattern record including component notes having greater attack intensity can be easily excluded from searched-out result candidates.

Furthermore, whereas the preferred embodiment has been described as using automatic accompaniment data sets each having a one-measure length, the sound lengths need not be so limited.

Further, whereas the preferred embodiment has been described above in relation to the case where, in response to user's input operation via any of the performance controls, a style record is searched for on the basis of a performance part corresponding to the operated performance control, the present invention is not so limited. The user may designate a performance part by use of the operation section 25 rather than any of the performance controls. In this case, input is made for the designated performance part as the user operates any of the performance controls after designating the performance part. For example, in this case, even when the user operates the chord tone inputting keyboard range 12 after designating the "bass" part via the operation section 25, the control section 21 regards this user's operation as input of the "bass" part.

Furthermore, whereas the preferred embodiment has been described above in relation to the case where different pads, such as the bass drum input pad 14*a*, snare drum input pad 14*b*, high-hat input pad 14*c* and cymbal input pad 14*d*, are allocated to the individual rhythm parts of different tone colors in one-to-one relationship, the present invention is not so limited and may be arranged in such a manner that input operation for rhythm parts of different tone colors can be performed via a single pad. In such a case, the user can designate a tone color of a desired rhythm part via the operation section 25.

Moreover, whereas the preferred embodiment has been described above in relation to the case where tone data are waveform data and where the search technique of the invention is used for searching for tone data (waveform data) associated with a tone generation pattern, the application of the present invention is not so limited. For example, the search technique of the invention can also be used for searching for tone color data (tone color ID or musical instrument type ID) associated with a tone generation pattern, or any other type of tone data associated with a tone generation pattern. Namely, the term "tone data" employed in the present invention is not limited to waveform data and embraces a broad concept including tone color data and other types of tone-related data.

The above-described preferred embodiment has been described above in relation to the case where the types of performance parts contained in a performance data set (automatic performance data set) are chord, bass drum, snare drum, high-hat and cymbals. However, the types and number of performance parts contained in a performance data set (automatic performance data set) are not limited to the aforementioned and may be increased or decreased as desired. Further, the formation of performance parts in a performance data set (automatic performance data set) may be modified variously as desired.

Further, in the present invention, sounds constituting a performance data set are not limited to sounds of percussion instruments as described above in relation to the preferred embodiment, and they may be sounds of any other musical instruments or may be non-musical-instrument sounds. For example, various sounds other than musical instrument sounds, such as voices of a human (person) or animal or sounds produced by striking a certain object, may be employed, as desired, as sounds of the rhythm parts, such as the drum, high-hat and cymbals.

This application is based on, and claims priorities to, Japanese patent application No. 2011-095473 filed on 21 Apr. 2011 and Japanese patent application No. 2012-094414 filed on 18 Apr. 2012. The disclosure of the priority applications, in its entirety, including the drawings, claims, and the specification thereof, are incorporated herein by reference.

What is claimed is:

1. An apparatus for searching through a first non-transitory storage medium for searched-out result part performance data matching an input search query, the first non-transitory storage medium storing therein a plurality of performance data sets each comprising part performance data of one or more performance parts, each of the one or more performance parts being associated with one performance part from among a plurality of different candidate parts of an ensemble, said apparatus adapted to communicate with an operable input device, said apparatus comprising:
   a second non-transitory processor-readable storage medium adapted to store instructions:
   a processor, when executing the instructions, adapted to:
   determine a style of operation performed on the input device;
   identify, on the basis of the determined style of operation, at least one of the different candidate performance parts as a search-object performance part;
   acquire a searching query pattern from the input search query as a search-object query pattern; and
   search the first non-transitory storage medium on the basis of both the search-object performance part and the search-object query pattern, for the searched-out result part performance data matching the input search query, wherein the searched-out result part performance data matches the identified performance part and matches the acquired searching query pattern.

2. The apparatus as claimed in claim 1, wherein said processor, when executing the instructions, is adapted to identify the at least one of the different candidate performance parts by referencing a correspondence relationship table in accordance with the determined style of operation, the correspondence relationship table storing therein correspondence relationship between individual ones of said one or more performance parts and individual ones of a plurality of types of styles of operation on the input device.

3. The apparatus as laimed in claim 1, wherein said processor, when executing the instructions, is adapted to extract, from the first non-transitory storage medium, at least one performance data set including the searched-out result part performance data searched out from the first non-transitory storage medium.

4. The apparatus as claimed in claim 1, wherein said query processor, when executing the instructions, is adapted to acquire the searching query pattern in response to an input operation for inputting a desired sound generation pattern performed via the input device.

5. The apparatus as claimed in claim 1, wherein said input device includes a plurality of controls, and
   said processor, when executing the instructions, is adapted to determine the style of operation on the basis of whether the number of the controls operated within a predetermined time period is singular or plural.

6. The apparatus as claimed in claim 1, wherein said input device includes at least one control, and
   said processor, when executing the instructions, is adapted to determine the style of operation on the basis of whether or not duration of the operation performed on the control has exceeded a threshold value.

7. The apparatus as claimed in claim 1, wherein said input device includes at least one control, and
   said processor, when executing the instructions, is adapted to determine the style of operation on the basis of whether or not intensity of the operation performed on the control has exceeded a threshold value.

8. The apparatus as claimed in claim 1, wherein said processor, when executing the instructions, is adapted to determine the style of operation on the basis of any one of, or a combination of two or more, of a plurality of different types of styles of operation.

9. The apparatus as claimed in claim 8, wherein said input device includes a plurality of controls, and
   said processor, when executing the instructions, is adapted to determine the style of operation on the basis of any one of, or a combination of two or more, of: (1) which of the controls has been operated; (2) whether a number of the controls operated within a predetermined time period is singular or plural; (3) whether or not duration of the operation performed on one or more of the controls has exceeded a threshold value; and (4) whether or not intensity of the operation performed on one or more of the controls has exceeded a threshold value.

10. A processor-implemented method for an apparatus to search through a non-transitory storage medium for searched-out result part performance data matching an input search query, the storage medium storing therein a plurality of performance data sets each comprising part performance data of one or more performance parts, each of the one or more performance parts being associated with one performance part among a plurality of different candidate performance parts of an ensemble, the apparatus adapted to communicate with an operable input device, said method comprising:
   determining a style of operation performed on the input device;
   identifying, on the basis of the determined style of operation, at least one of the different candidate performance parts as a search-object performance part;
   acquiring a searching query pattern from the input search query as a search-object query pattern; and
   searching the storage medium, on the basis of both the search-object performance part and the search-object query pattern, for the searched-out result part performance data matching the input search query, wherein the searched-out result part performance data matches the identified performance part and matches the acquired searching query pattern.

11. A second non-transitory computer-readable storage medium containing a group of instructions for execution by a processor to cause an apparatus to perform a method for searching through a first non-transitory storage medium for searched-out result part performance data matching an input search query, the first non-transitory storage medium storing therein a plurality of performance data sets each comprising part performance data of one or more performance parts, each of the one or more performance parts being associated with one performance part among a plurality of different candidate performance parts of an ensemble, the apparatus adapted to communicate with an operable input device, said method comprising:

- determining a style of operation performed on the input device;
- identifying, on the basis of the determined style of operation determined by said determination step, at least one of the different candidate performance parts as a search-object performance part;
- acquiring a searching query pattern from the input search query as a search-object query pattern; and
- searching the first non-transitory storage medium on the basis of both the search-object performance part and the search-object query pattern, for the searched-out result part performance data matching the input search query, wherein the searched-out result part performance data matches the identified performance part and matches the acquired searching query pattern.

* * * * *